A. H. ELLIS.
TYPE WRITING AND COMPUTING MACHINE.
APPLICATION FILED AUG. 21, 1912.
1,316,434.
Patented Sept. 16, 1919.
9 SHEETS—SHEET 1.
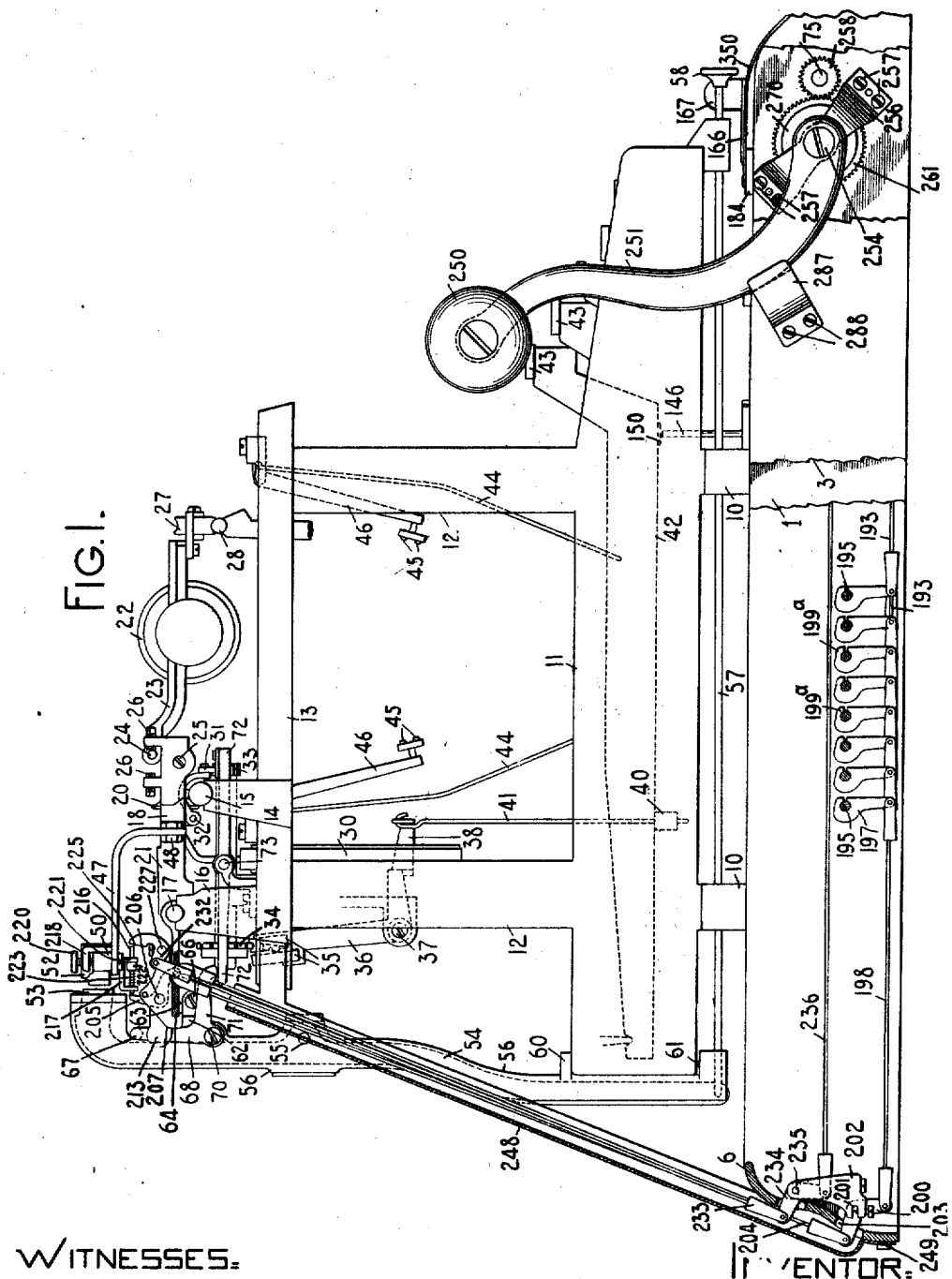
WITNESSES:
L. Nelson
R. H. Strother
INVENTOR:
Albert H. Ellis
By Jacob Felbel
HIS ATTORNEY A. H. ELLIS.
TYPE WRITING AND COMPUTING MACHINE.
APPLICATION FILED AUG. 21, 1912.
1,316,434.
Patented Sept. 16, 1919.
9 SHEETS—SHEET 2.
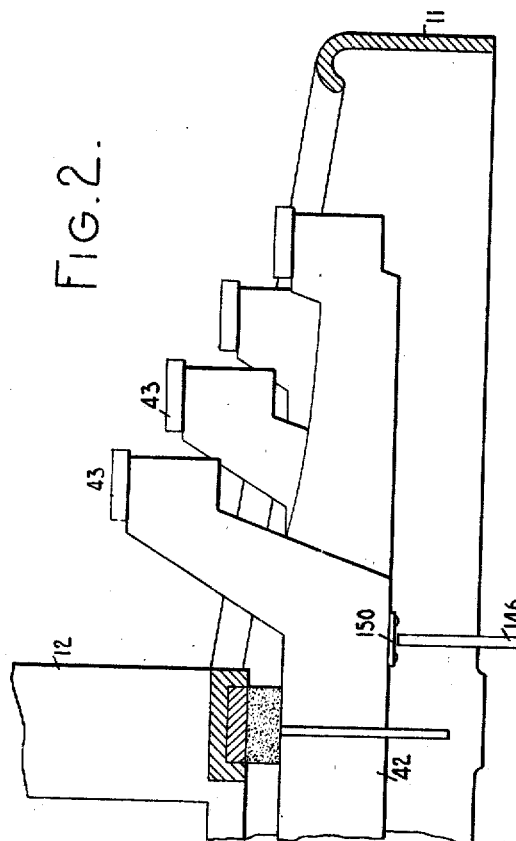
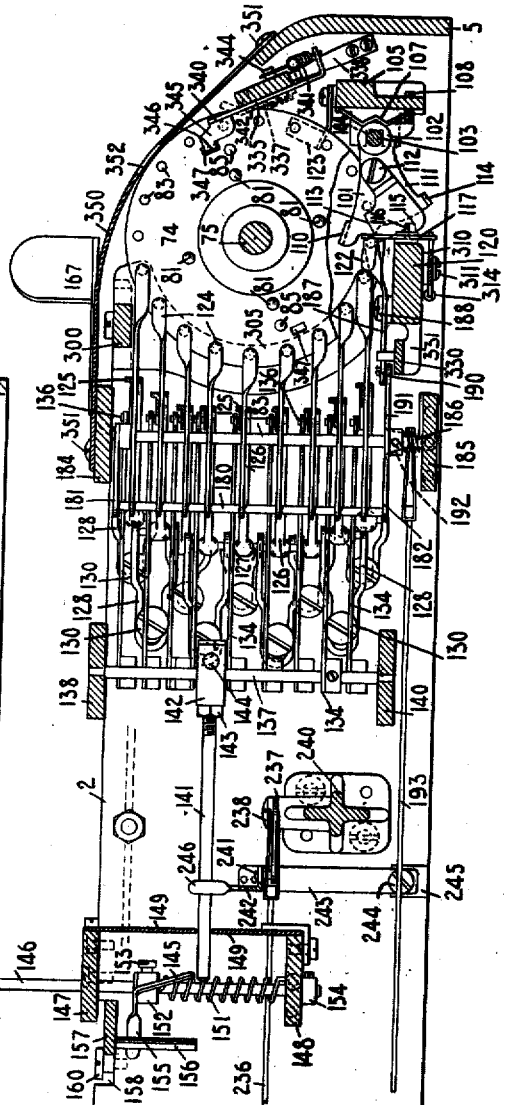
WITNESSES:
L. Nelson
R. H. Strother
INVENTOR:
Albert H. Ellis
By Jacob Felbel
HIS ATTORNEY A. H. ELLIS.
TYPE WRITING AND COMPUTING MACHINE.
APPLICATION FILED AUG. 21, 1912.

1,316,434.

Patented Sept. 16, 1919.
9 SHEETS—SHEET 3.

WITNESSES:

INVENTOR:
Albert H. Ellis
By Jacob Felbel
HIS ATTORNEY

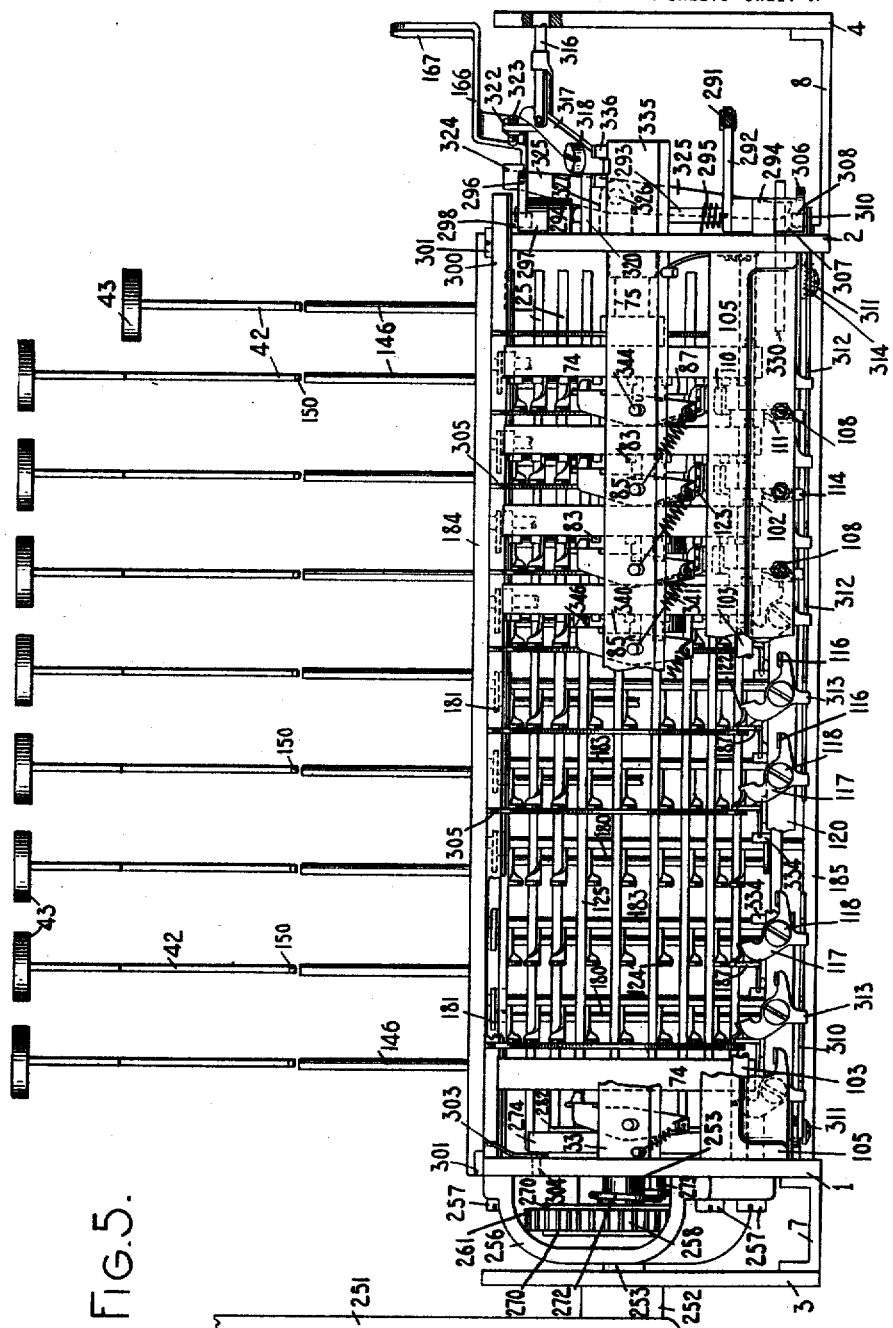

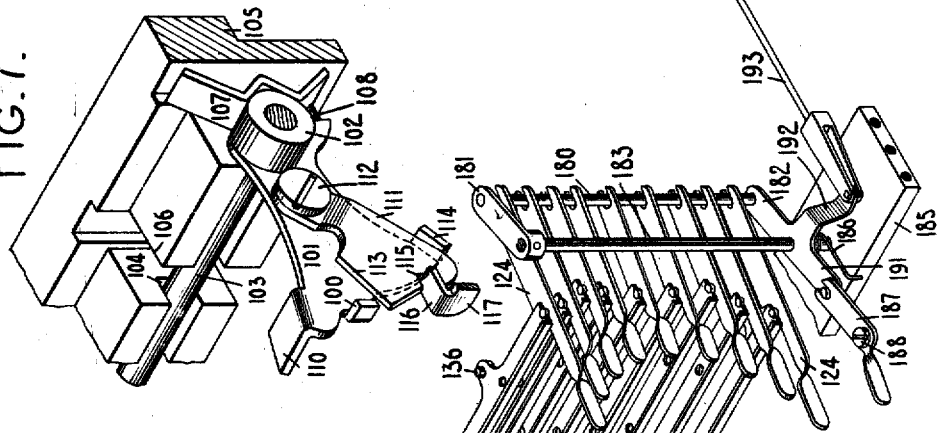

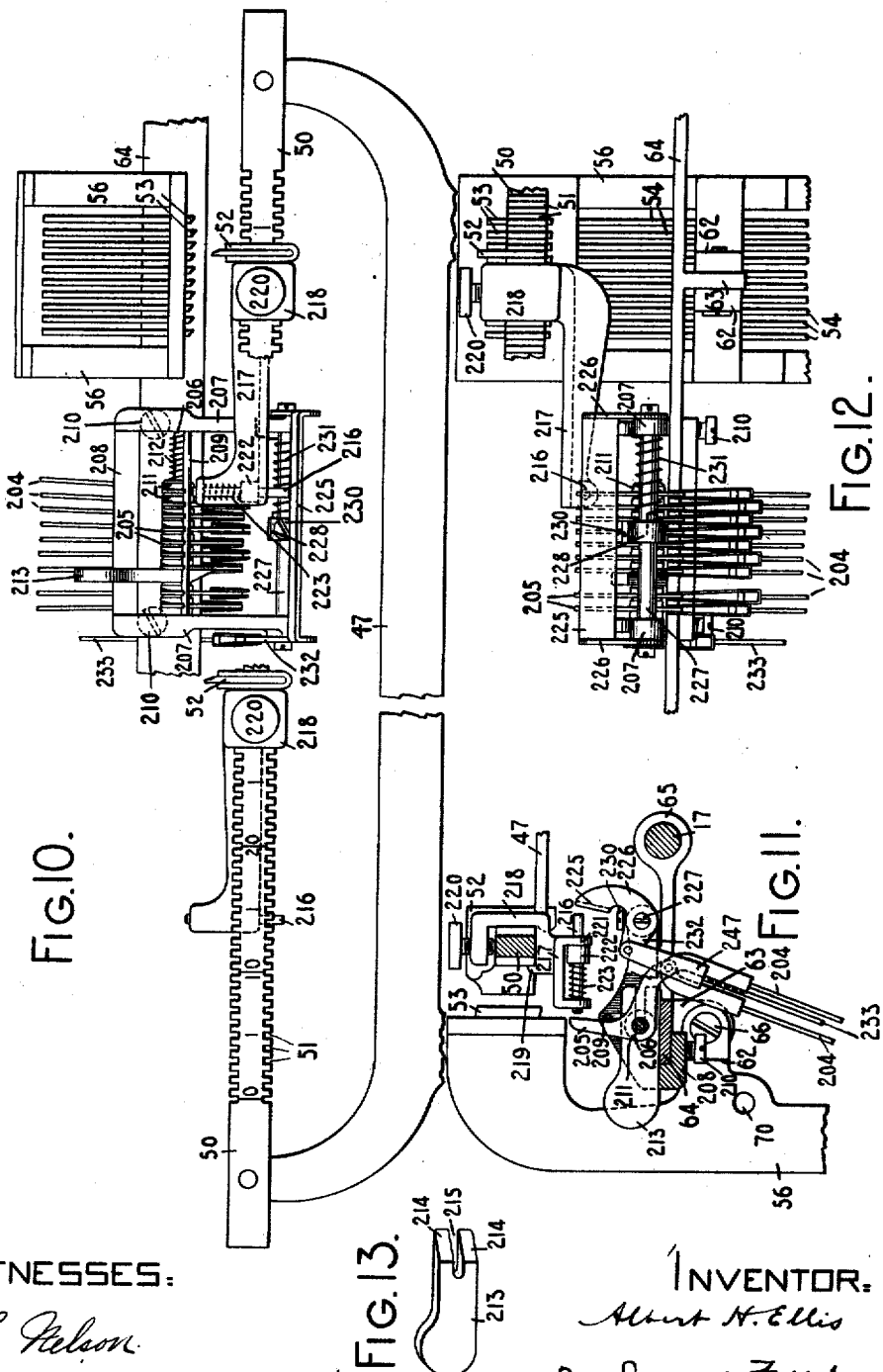

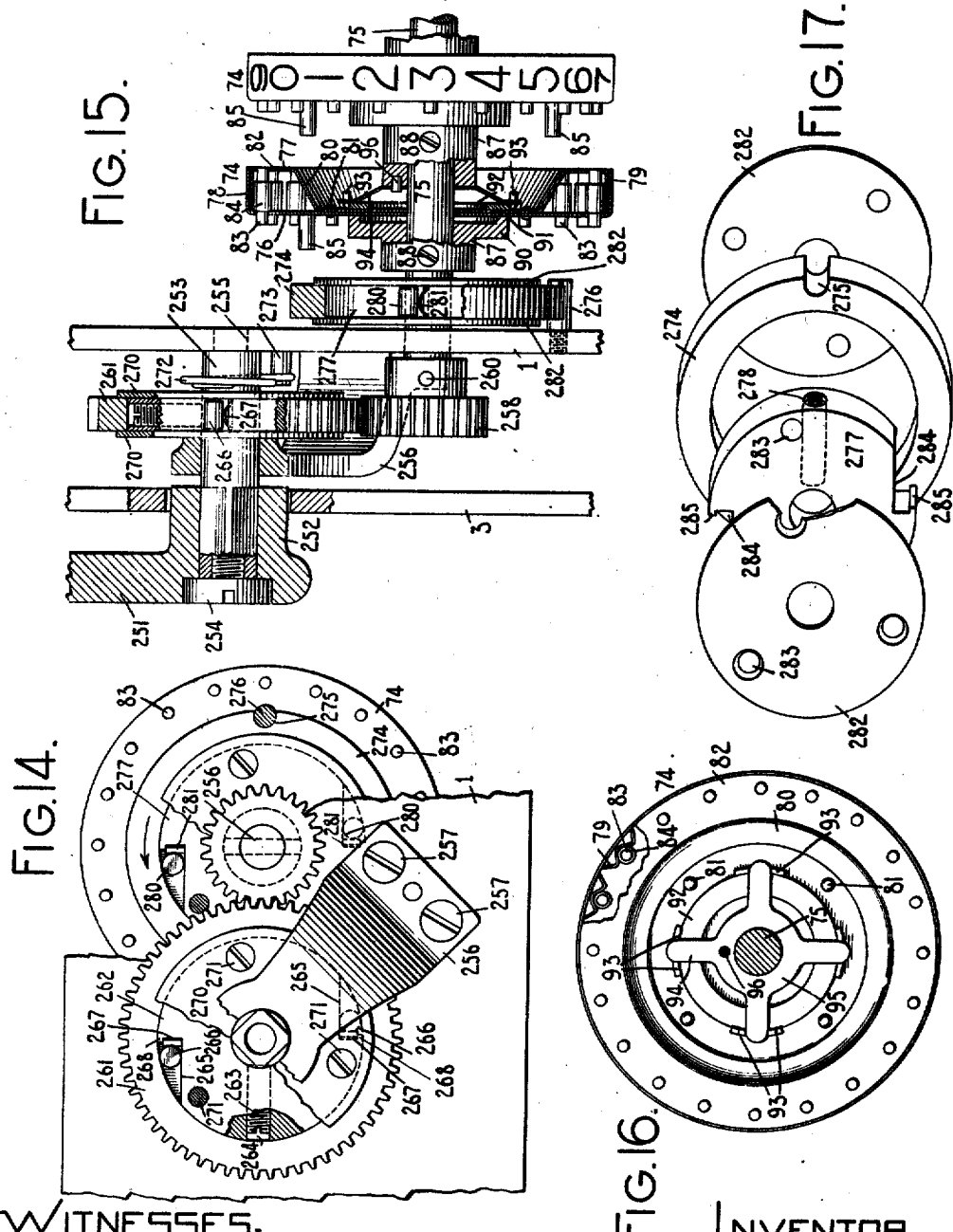

A. H. ELLIS.
TYPE WRITING AND COMPUTING MACHINE.
APPLICATION FILED AUG. 21, 1912.
1,316,434.
Patented Sept. 16, 1919.
9 SHEETS—SHEET 8.
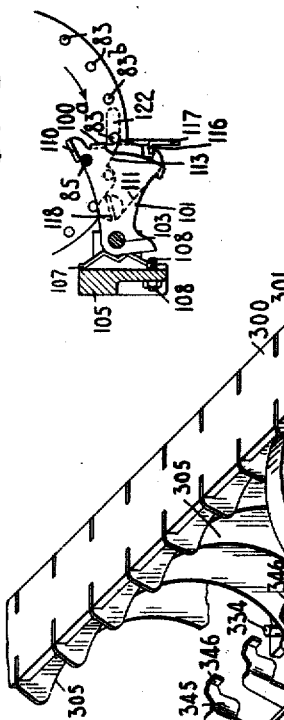
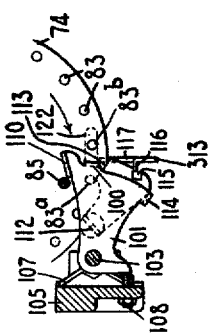
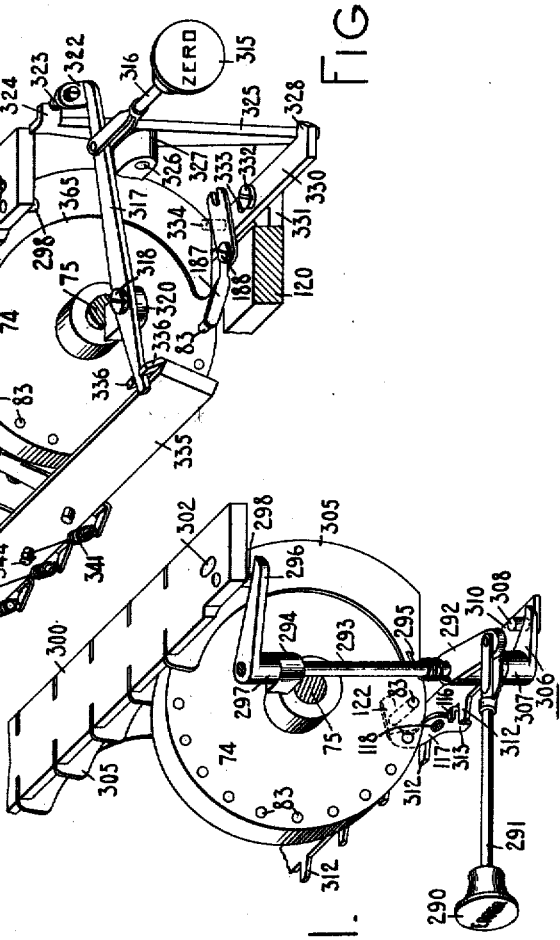
WITNESSES:
L. Nelson.
R. H. Strother.
INVENTOR
Albert H. Ellis
By Jacob Felbel
HIS ATTORNEY

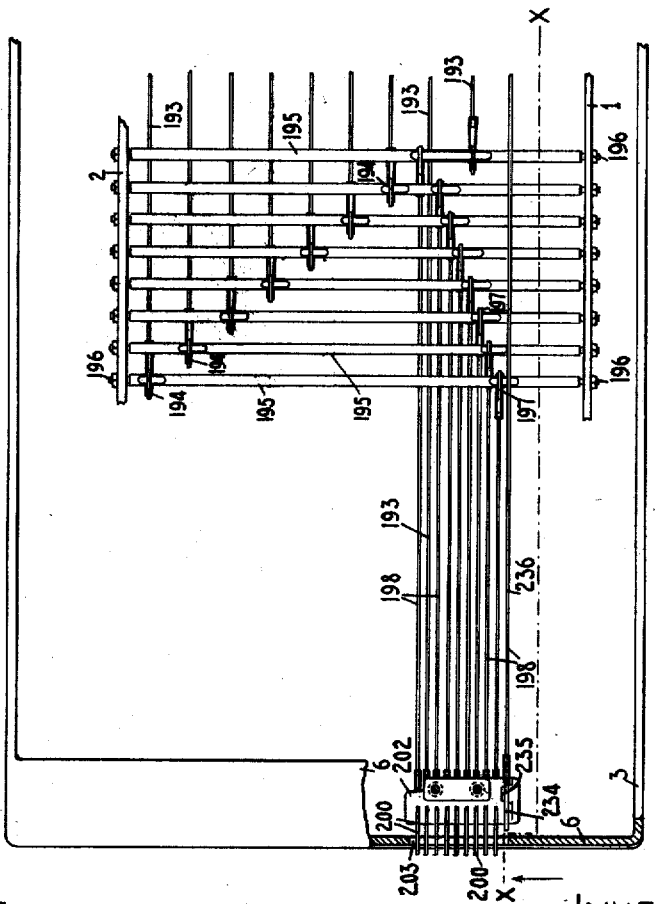

UNITED STATES PATENT OFFICE.

ALBERT H. ELLIS, OF BRIELLE, NEW JERSEY, ASSIGNOR, BY MESNE ASSIGNMENTS, TO REMINGTON TYPEWRITER COMPANY, OF ILION, NEW YORK, A CORPORATION OF NEW YORK.

TYPE-WRITING AND COMPUTING MACHINE.

1,316,434.   Specification of Letters Patent.   Patented Sept. 16, 1919.

Application filed August 21, 1912. Serial No. 716,156.

*To all whom it may concern:*

Be it known that I, ALBERT H. ELLIS, citizen of the United States, and resident of Brielle, in the county of Monmouth and State of New Jersey, have invented certain new and useful Improvements in Type-Writing and Computing Machines, of which the following is a specification.

My invention relates to computing machines and also to combined typewriting and computing machines.

One of the principal objects of my invention is to provide an improved computing attachment to a typewriting machine, although many of the features of my invention are applicable to machines other than such an attachment. Specifically stated, one of the objects of my invention is to provide a computing attachment to a typewriter having the computing mechanism in many respects of the general character of that shown in my prior Patent No. 852,016, dated April 30th, 1907, but to connect said computing mechanism with the typewriting mechanism by purely mechanical connections instead of the electrical connections shown in said patent.

My invention has for another object to improve some of the details of construction shown in my said prior patent, making some of the parts better in certain respects, and making some of said parts cheaper to manufacture. Other objects of the invention will appear in the course of the description and claims.

To the above ends my invention consists in certain features of construction and combinations and arrangements of parts, all of which will be fully set forth herein and particularly pointed out in the claims.

In the accompanying drawings,

Figure 1 is a side elevation on a reduced scale of a combined typewriting and computing machine made in accordance with my invention, the section being in part on the line *x x* of Fig. 22.

Fig. 2 is a fore and aft section through the front part of the combined machine.

Fig. 3 is a front elevation, partly in section, and illustrating a detail.

Fig. 5 is a front elevation of the computing mechanism, the numeral keys and key levers of the typewriter being shown conventionally.

Fig. 6 is a fragmentary isometric view of part of the setting-up mechanism.

Fig. 7 is an isometric view on an enlarged scale of the principal parts of the transfer mechanism.

Fig. 8 is a similar view of a certain lever.

Fig. 9 is a fragmentary plan view of part of the setting up mechanism and illustrating the operation of setting one of the stops, parts being shown in their operated positions.

Fig. 10 is a fragmentary top plan view of a portion of the rear part of the typewriter carriage and tabulator mechanism and some of the associated computer connecting devices.

Fig. 11 is a sectional side elevation of the same.

Fig. 12 is a front elevation of the same.

Fig. 13 is an isometric view of a certain spacing device.

Fig. 14 is a fragmentary side elevation with parts in section and broken away and showing the connections from the operating handle to the register wheels.

Fig. 15 is a front view of the same and some of the associated parts.

Fig. 16 is a face view of one of the register wheels and some of its driving devices.

Fig. 17 is an isometric view showing the parts of certain detent mechanism dis-assembled.

Figs. 18 and 19 are fragmentary side elevations illustrating the operation of the transfer mechanism. In Fig. 18 the transfer pin of one wheel is in the act of tripping the stop of the next higher wheel, and in Fig. 19 the operation of the first wheel is completed, and the second wheel is in the act of moving one space and of setting a new stop to operative position.

Fig. 20 is an isometric view illustrating the zero setting mechanism.

Fig. 21 is a similar view illustrating the error key and its connections.

Fig. 22 is a top plan view on a reduced scale of the denomination selecting connections in the lower rear part of the machine.

Fig. 23 is an enlarged isometric view of a certain shaft and lever arm, and the manner of connecting the two.

Figure 4:
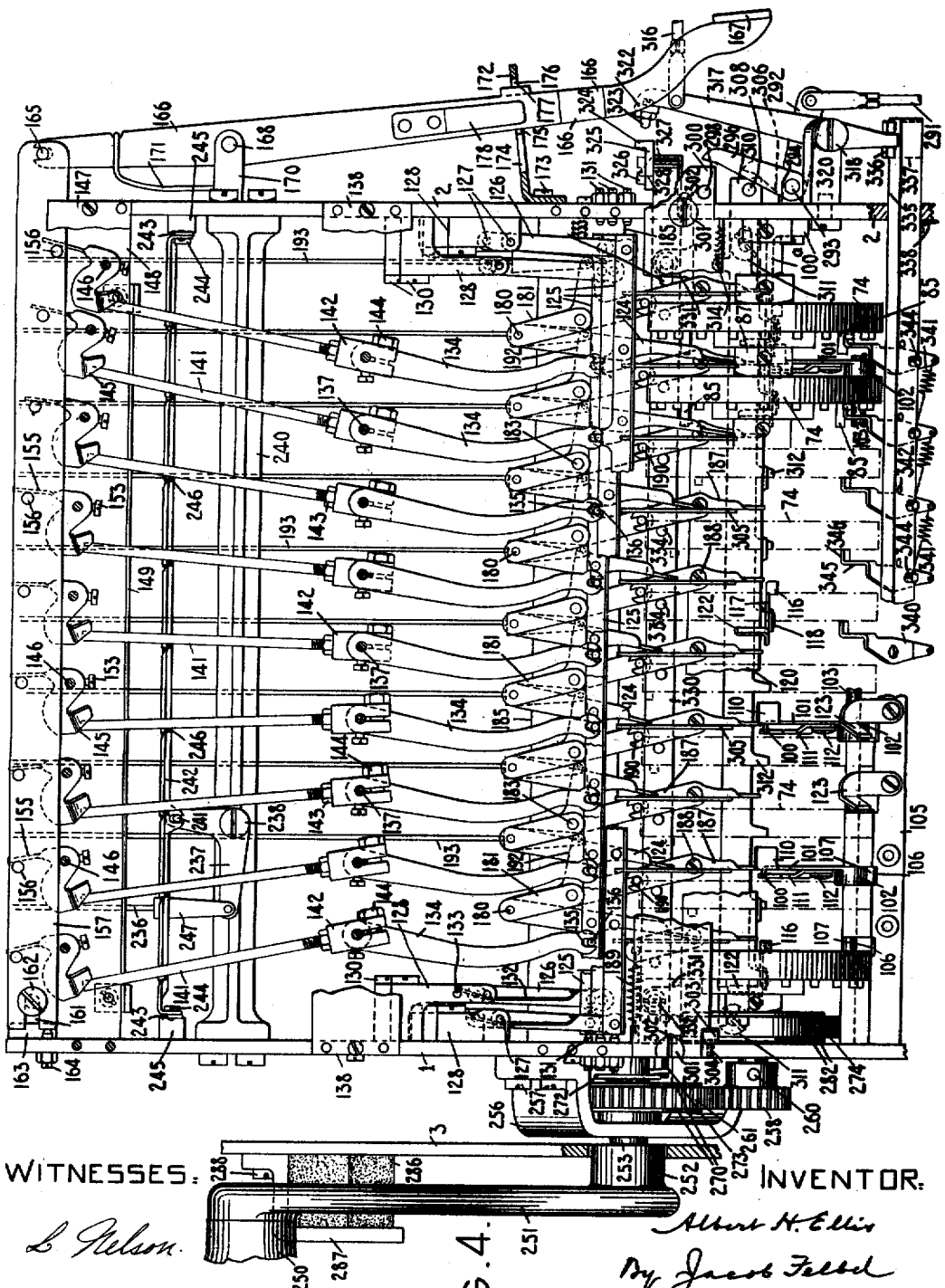
Fig. 4 is a top plan view of the forward part of the computing mechanism.

In most of the views parts have been shown in section and parts have been broken away or omitted entirely, as has been found convenient for the purpose of illustration.

In the specific form of connections which I have here shown between the typewriter and the computer the typewriter frame is mounted on top of the computer frame as shown in Fig. 1. Said computer frame as shown may be said to comprises two frames, an inner frame which supports most of the mechanism, and an outer frame that is somewhat in the nature of a casing. Said inner frame comprises two side bars or plates 1 and 2, Figs. 1 and 5, which side bars extend from the front to the back of the machine and are connected together by various transverse bars, as will appear more in detail hereinafter. The outer frame or casing comprises two bars 3 and 4, Fig. 5, which extend lengthwise of the machine and are connected together at their forward ends by a bar 5, Fig. 2, and at their rear ends by a bar or plate 6, Fig. 1, and the bars 1 and 2 are also secured at their ends to the bars 5 and 6. The two frames can be connected by any suitable form of brackets 7 and 8, Fig. 5. Said frames may be provided with any suitable feet or other base supports. The outer frame comprising the side bars 3 and 4 and the end bars 5 and 6, can, if preferred, be a single casting.

The typewriter frame may be supported from the computer frame in any suitable manner. As here shown brackets 10, secured to the side bars 3 and 4 and rising therefrom, take the place of the rubber feet ordinarily employed to support the base part 11 of the main frame of a Remington typewriter, the typewriter shown in the drawings being of the sort known in the art as a Remington No. 7. The main frame of this machine comprises, besides the base part 11, corner posts 12 which support a top plate 13. From said top plate rise standards 14 which support the main transverse carriage rail 15 and also standards 16 which support another or guide rail 17, said rails supporting and guiding the truck 18 of the typewriter carriage. Said carriage is provided with grooved wheels 20 which run on the rail 15 and also with a rearwardly extending bar 21, the rear end of which is guided by the rail 17. The carriage supports or includes a platen 22 which is carried in a platen frame 23 which at 24 is pivoted to a shifting or swinging frame which is pivoted to the truck 18 at 25, said shift frame being capable of swinging toward the front or back of the machine between stops 26 for upper and lower case writing. The forward part of the platen frame 23 has a grooved roller 27 riding on the rail 28 of the shift frame which is moved toward the front or rear by a case shift key mechanism which is not shown herein.

The carriage is fed across the machine by means of a spring drum 30 and its travel is controlled by feed mechanism which includes a feed rack 31 pivotally supported on the carriage at 32 and normally meshing with a feed pinion 33 rigid on the forward end of a shaft, the rear end of which carries an escapement wheel 34 with which engage dogs 35 mounted on a dog rocker 36 which is pivoted at 37 to the stationary frame work and is formed with forwardly directed transversely spreading arms 38 which are connected with the universal bar 40 of the machine by wires 41. Said universal bar underlies the key levers 42 which have at their forward ends printing keys 43. Said key levers are connected by links 44 with printing instrumentalities which in this machine take the form of types 45 mounted on the ends of bottom strike type bars 46.

The typewriter is shown equipped with a denominational tabulator which is shown in Figs. 1, 10, 11 and 12. A frame 47, Fig. 10, is connected to the carriage truck 18 at 48, Fig. 1, and said frame comprises two rearwardly extending arms which support a transverse column stop bar 50 which, as here shown, has the form of the usual square bar with slots 51 on opposite sides thereof, said slots being spaced letter space distances apart and adapted for the insertion therein of the usual bifurcated column stops 52. As many of these stops can be used as desired, and each of them is adjustable longitudinally of the bar 50 by withdrawing it and inserting it in any desired pair of the slots 51. The column stops 52 are adapted for coöperation with a series of denominational stops 53, said denominational stops consisting of the upper ends of a series of levers 54 which at 55 are pivoted in a stationary frame 56 and at their lower ends are connected with the rear ends of push rods 57 which at their forward ends have tabulator keys 58 thereon. The construction is such that by pushing toward the rear on any one of the keys 58 the corresponding one of the denominational stops 53 is swung forward into the path of the column stop or stops 52.

The frame 56 is secured to the base 11 of the typewriter by a flange 60 above said base, and set screws 61 screwed up against the underside of the base. The upper part of said frame is formed with two forwardly projecting lugs 62, Fig. 12, between which extends a lug 63 depending from a cross bar 64 made in a sort of elongated U-shape and having at its ends eyes 65, Fig. 11, which surround the guide rail 17. The lug 63 is connected with the lugs 62 by means of a screw 66.

The tabulator is provided with a carriage release mechanism comprising a universal bar 67, Fig. 1, connecting the upper ends of two arms 68 which are pivoted to the frame 56 at 70. One of the arms 68 has a forwardly directed arm 71 which overlies the rear end of a lever 72 which at its middle is pivoted at 73 to the stationary framework and which at its forward end underlies the rack bar 31. The construction is such that when any of the denominational stops moves toward the front of the machine, the universal bar 67 is thereby moved toward the rear end of the machine, depressing the rear end of the lever 72 and elevating the forward end of said lever and thereby lifting the feed rack 31 out of mesh with the pinion 33.

I have not illustrated nor described the typewriter mechanism in all of its details because said mechanism is old and familiar to those skilled in the art, the Remington typewriter being well known, and because, further, the precise detail construction of these elements may be varied without affecting my invention. I have shown some of the parts of the typewriter in detail in order to make clear the details of the specific form of connection to the computer shown in the present instance. The specific form of these connections would no doubt have to be modified in case it was desired to adapt the invention to some typewriting machine differing specifically from the one shown.

The register wheels 74 are mounted on a driving shaft 75 which extends across the front of the machine, being journaled at its ends in the frame plates 1 and 2. Each of said register wheels is independently frictionally connected with the shaft 75. Said wheels, in the general principle of their construction and operation, resemble those of my prior Patent No. 852,016, above referred to, but both the wheels themselves and the frictional connections differ specifically from the corresponding parts of said patent. The construction of these parts is best shown in Figs. 15 and 16. In some of the other figures these parts are shown more or less conventionally.

The wheels are of a lighter and cheaper construction than in my said patent. Each of said wheels comprises two pieces 76 and 77, both of said pieces being made from sheet metal by stamping or spinning. The piece 76 comprises a web here shown as being flat, and a peripheral cylindrical part 78 on which are imprinted in any suitable manner the digits from "0" to "9" inclusive. In the present instance each wheel has twenty digits, that is to say, it has two series of digits from "0" to "9", each increment of motion of the wheel when operated, therefore, being equal to one twentieth of a rotation. The piece 77 comprises a dished part 80, the flat bottom or web of which lies against the web of the piece 76 to which it is secured in any suitable manner. As shown, the two webs are fastened together by rivets 81. The dished part 80 connects the web of the part 77 with an annular flat part 82, the external diameter of which is preferably substantially equal to the internal diameter of the cylinder 78. Said annulus 82 fits inside of said cylinder, thus making a closed wheel, as will be understood by the section shown in Fig. 15. Near the periphery of the wheel each of the pieces 76 and 77 is formed with a series of twenty holes in each of which is a settable digit determining device here shown in the form of a pin 83. Each of said pins is preferably formed with an enlarged part 84 within the wheel of a length a little less than the internal thickness of the wheel. The pin is free to be slid lengthwise a distance which is limited by the contact of the enlargement 84 with one or the other flange of the wheel. Normally the pins project from the wheel toward the left as shown in Fig. 15 but any one of them can be pressed toward the right, in which case it will project from the right-hand face of the wheel and serve as a stop coöperating with other devices to be presently described. The pins are frictionally held in either position by springs 79 of the form shown, and each spring in between one of the pins 83 and the periphery 78 of the wheel.

Each of the wheels is also provided with two fixed transfer pins 85 projecting from the left-hand face thereof. These pins may be secured in any suitable way to the piece 76. For example, the pins can have their right-hand ends reduced, thus forming a shoulder and the reduced end of the pin passed through a hole in the web of the wheel and riveted up.

The frictional connections between the wheels 74 and the shaft 75 are specifically different from those of my prior patent. Alternating with the register wheels are a series of collars 87 each secured to the shaft 75 by a set screw 88. Each of the collars 87 has a disk-like part 90 from which an annular flange 91 projects toward the right into contact with the web of the next adjacent register wheel. Opposed to the flange 91 is a friction ring 92 on the opposite side of said wheel, said friction ring or annulus having several pairs of ears 93 bent up therefrom and between the ears of each pair there lies an arm 94 of a spider spring 95, which spring surrounds the shaft 75 and bears against the left-hand end of the next succeeding collar 87, said spring being compressed between said collar and the register wheel. In the present instance the spider spring is shown with four arms 94 and these, coöperating with the ears 93, hold the ring 92 in its centered position. The spider spring 95 is forced to turn with the shaft 75 by means of a pin 96 passing through a hole in said spring and fast in the end of the collar 87. It will be seen that the friction is applied at the annular surfaces of the flange 91 and the ring 92, both of which surfaces are removed some distance from the center of rotation. The ends of the arms 94 would themselves give the necessary friction if applied to the webs of the wheels, but the rings 92 take the wear to very much better advantage, as will be understood. Suitable washers of some softer material than metal can, if preferred, be placed between the web of the wheel and the parts 91 and 92. The lubricating pads shown in my prior patent are not necessary here because the shaft does not turn continuously in the present machine; but such pads can be employed if desired and they would be employed if the present construction of wheels and connections was employed in a machine with a continuously rotating shaft. It will be perceived that the described frictional connection is efficient, that it guides the register wheel with exactness in its rotation, and that it is inexpensive to manufacture and easily assembled. It will be understood that the web portions of the pieces 76 and 77 of the register wheel take a bearing on the shaft 75. The ring 92 and the spring 95 are preferably both stamped up out of sheet metal.

The stop pins 83 are adapted, when pushed to their operative or right-hand position, to coöperate with a stop 100, Fig. 7, consisting of an ear bent off toward the left from a transfer lever 101, the hub 102 of which is pivoted on a pivot rod 103, which pivot rod is laid for the sake of stiffness in a longitudinal slot 104 cut in a transverse frame bar 105 mounted in the lower part of the computer frame in front of the lower parts of the register wheels 74. The bar 105 is secured at its ends to the frame plates 1 and 2 and it constitutes one of the fixed transverse bars by which said plates are connected. There is, of course, a series of the levers 101 strung along the rod 103 and each of said levers is seated in a transverse slot 106, Fig. 7, which prevents endwise motion of said lever. Each lever 101 is capable of a limited amount of motion in an up and down direction and it is held in either its upper or its lower position by means of a friction spring 107 shaped somewhat like the letter W and engaging the hub 102 in the manner shown in Figs. 2 and 7. The downward motion of the lever 101 is positively limited by an adjustable stop screw 108, Fig. 19, threaded through the bar 105. The lever 101 normally stands in its lower position, shown in Figs. 2 and 19, in which position the stop 100 is in the path of motion of the pins 83 when said pins are projected toward the right.

Each of the levers 101 has a cam 110 thereon which cam is here shown as consisting of an ear bent off toward the right from the body of said lever and normally standing as shown in Fig. 19 in the path of the pins 85 of the next succeeding register wheel to the right and at an inclination to said path. The construction is such that when the wheel of lower order passes from "9" to "0" one of its pins 85 passes under the cam flange 110 and elevates the lever 101 to the position shown in Fig. 18, in which figure the latter part of this elevating operation is illustrated. The elevation of the lever 101 in this manner moves the stop 100 up out of the path of the pin 83 and allows that pin 83 which is set for engagement with it to pass. In Fig. 2 the wheel nearest the observer has been broken away at its lower part, so that the mechanism on both sides of said wheel is shown in full lines.

When a set pin 83 passes the stop 100 in the manner just above described, said stop is automatically reset to its normal position shown in Fig. 19, and the next succeeding pin 83 is pressed to its right-hand or operative position, by means which will now be described. The lever 101 has a second lever 111 pivoted to the left-hand side thereof on a shouldered and headed pivot screw, or rivet 112. Said lever 111 has a part of its upper edge formed as an incline or cam 113 which, when a set pin 83 passes the stop 100, stands in the path of said pin with the result that said pin in passing cams the lever 111 downward as illustrated in Fig. 19. The lever 101 has an ear 114 bent off therefrom beneath the lever 111 so that when said lever 111 is cammed down in the manner just described, it carries the lever 101 with it, thus restoring said lever 101 to normal position at the period indicated in Fig. 19.

The next succeeding pin 83 is set to operative position by means operated by the downward motion of the lever 111, as just above described. Said lever 111 has a notch 115 formed therein and into said notch there projects an ear 116 bent off from a setting lever 117, which lever is shown in detail in Fig. 8. The lever 117 stands at right-angles to the levers 101, 111; that is to say, it is pivoted on a pivot that extends fore and aft of the machine instead of transversely thereof. As best shown in Figs. 2 and 5, these levers 117 are pivoted on screws 118 threaded into the forward face of a transverse frame bar 120 which at its ends is fastened rigidly to the frame plates 1 and 2. Said screws 118 pass through holes 121, Fig. 8, in the levers 117. Each of said levers has an ear 116 bent off from a horizontally disposed arm of the lever and each of said levers has also a vertically disposed arm from which a long ear 122 is bent off toward the rear of the machine. This ear 122 is on a level with the path of the pins 83 and is on the left-hand side of the same register wheel whose pins 83 are arrested by the associated stop lever 101 and stop 100. In Figs. 18 and 19 I have marked that pin 83 which was set by the setting-up mechanism 83ᵃ and the next succeeding pin I have marked 83ᵇ. The construction is such that when a set pin, as 83ᵃ, cams the lever 111 downward, as indicated in Fig. 19, the right-hand or horizontal arm of the lever 117 is depressed and the left-hand or upright arm of said lever is moved toward the right with the result that the ear 122 on said upright arm presses to operative position the pin 83ᵇ next succeeding the pin 83ᵃ, so that it is the movement of the wheel that sets said next succeeding pin to operative position. It will be apparent from what has been said and from an inspection of Fig. 19 that this next succeeding pin 83ᵇ will be set to operative position and will be arrested by the stop 100. It will thus be seen that the register wheel with which these parts coöperate has been allowed to move a distance equal to the space between two successive pins 83, that is to say, it has been allowed to move one unit's increment by transfer, and that the transfer lever 101 has been restored to its normal position.

It will also be perceived that the lever 117 is left in its operated position where the ear 122 thereof would, if allowed to remain in that position, arrest the next unset pin 83 if the register wheel were otherwise free to turn. Said register wheel is, however, freed for turning in only two ways, one of these ways being by transfer as just above described, and the other by setting the pins to add a digit on that wheel. In case the wheel is turned by transfer, this is brought about by the transfer pin 85 lifting the lever 101, as shown in Fig. 18. Under these conditions the lever 111 is lifted also by the lug or ear 114, with the result that the ear 116 of the lever 117 is lifted and said lever 117 is restored to normal position where the ear 122 is out of the path of the pins 83. The operation of adding a digit on this particular register wheel 74, consists in setting the appropriate one of the pins 83 to its right-hand or operative position and restoring to inoperative position that one of said pins which is in engagement with the stop 100. This setting and restoring of pins is done by mechanism which will be described hereinafter. In case the pin 83 which is in engagement with the stop 100 is reset for the purpose of adding a digit, then said pin will itself push the ear 122 and restore said ear and the lever 117 to normal position, carrying the lever 111 with said lever 117 without lifting the lever 101. In that case the lever 117 will be in the inoperative position described and the lever 111 will be elevated to such a position that it does not contact with the lug 114. This is the position of the parts shown in Fig. 2. If the parts stand in this position the first operation of the transfer lever by the pin 85 will take up the lost motion between the lever 111 and the lug 114, thus bringing the parts to the positions represented in Fig. 18. As the wheel 74 of lowest order never receives motion by transfer, no transfer lever 101 is necessary for said wheel, and a stationary stop arm 100ᵃ is therefore provided for said wheel, as shown in dotted lines in Fig. 4.

The transfer devices above described differ from those in my prior patent hereinbefore referred to in details of construction and operation, although the general principle is substantially the same. In the patent the transfer lever was moved by the transfer pin away from the center of the wheel, whereas in the present instance it is moved toward the center of the wheel. This difference enables me in the present instance to restore the transfer lever 101 by the direct action of the lever 111, whereas in the patent a separate cam was required for the restoration of the transfer lever. In the present instance also the connection between the lever 111 and the pin-setting lever 117 is positive in both directions so that said lever 117 is restored to normal position by the actuation of the lever 101 by the pin 85, an operation which did not take place positively in the patented machine but required individual springs for the several levers.

The present mechanism, like that of the patent, leaves a pin 83 set in its operated position when said pin passes the transfer lever by transfer from another wheel. In order to restore these pins to normal position a series of cams or wipers 123 are provided (Figs. 2 and 4), said wipers consisting of sheet metal arms secured to the upper edge or surface of the cross bar 105 and bent in such a way that by the turning of the wheels the pins 83 are wiped or cammed by said arms back to their inoperative or normal positions.

The setting-up mechanism for setting the digit pins 83 comprises a series of sets of setting devices having the form of levers 124, said levers controlled in a manner somewhat similar to the corresponding parts in my prior patent. There is a set of nine of these levers for each register wheel, one lever for each digit. The lever nearest the bottom of the machine corresponds to the digit "1", the next lever to the digit "2," and so on, the topmost lever corresponding to the digit "9." There is thus a "1" lever for each register wheel, a "2" lever for each register wheel, and so on. All of the levers corresponding to any given digit are pivoted near their middles on a transverse bar 125. There are nine of these bars, one for each digit, and said bars may therefore be termed "digit bars" or "digit selectors." Said digit bars extend across the machine behind the register wheels and each of them is supported for a limited extent of longitudinal motion. As here shown, each of these bars is mounted at each end thereof on an arm 126, which arm has a transverse pivot 127, said pivots being mounted in a series of bifurcated hangers 128, each secured by a screw 130 to the inner face of one of the frame bars 1 and 2. The hangers shown are similar in every respect to some of the type bar hangers of the Remington machine. As the pivots 127 are of a substantial length they maintain the levers or arms 126 in a horizontal position, guiding said levers accurately and supporting the bars 125. This form of support does not include any sliding of the bars and is therefore attended with less friction than in my prior patent. The hangers have the construction and the staggered arrangement that will be understood from an inspection of Figs. 2 and 4.

The motion of the digit bars 125 is limited by a set of adjustable stop screws 131 threaded through the plates 1 and 2 in position to be struck by the ends of the bars 125. There is preferably one of these screws for each end of each bar and said screws may be provided with lock nuts as shown.

The digit bars 125 are normally maintained in their left-hand positions by any suitable restoring springs. In the present instance springs 132 are shown in Fig. 4, said springs being bent about the pivots 127 and each at one end engaging the arm 126 and at the other end a fixed part such, for example, as the rivet 133 which connects the two arms of the hanger. In case, as is contemplated in the present instance, it is desired to operate the machine by mechanical means from the typewriter, each of the bars 125 will be connected by some suitable means with one of the numeral keys 43 of said typewriter. I prefer the means shown in the present instance though other devices can of course be employed. Said bars 125 are here shown as operated by a series of levers of the first order, each comprising a horizontal arm 134 having at its forward end an open slot 135 which embraces a pin 136 on one of the bars 125. As these bars 125 are arranged one above another the arms 134 are of course at different heights. Preferably these arms are also distributed across the machine approximately in the same manner as the numeral keys. In the Remington typewriter the digit "1" is written by the "L" key which is near the right-hand side of the machine and the other digits are written by special keys in the rear row, the "2" key being at the left, and the other keys following in succession across the keyboard. In Fig. 4 therefore the right-hand one of the arms 134 is connected to the lowermost one of the bars 125. The arm 134 next to the right-hand one just mentioned corresponds to the digit "9" and is connected to the topmost one of the bars 125.
The next lever arm is for the digit 8 and is connected with the next to the topmost bar, and so on, as will be understood by comparing Figs. 2, 4 and 6.

Each of the arms 134 is mounted on a vertical rock shaft 137, said rock shafts being arranged in a row across the machine and being pivoted as shown in Fig. 2, at their upper ends in a traverse frame bar 138 and at their lower ends in a transverse frame bar 140, said frame bars being connected at their ends to the plates 1 and 2.

The shafts 137 constitute the fulcrums or pivots of the several digit levers, each of which also includes a rearwardly extending arm 141 here shown as a round rod or wire threaded into a hub 142 and secured by a lock nut 143. Said hubs 142 are split as shown in Fig. 4 and each of them is adapted to have its split end tightened about the shaft 137 by means of a screw 144. The construction is such that the arm 141 can be adjusted quite exactly with relation to the arm 134 of the same lever and said adjustment can then be maintained by tightening the screw 144. The length of the arm 141 can also be adjusted by screwing into and out of the hub 142 for a reason that will presently appear. Such adjustment is maintained by tightening the lock nut.

The arms 141 are operated by cams 145 mounted on stems or plungers 146 which are mounted for vertical sliding motion in two fixed frame bars 147 and 148, said frame bars being secured to the side plates 1 and 2. Said arms 141 work in and are guided by a slot formed by two plates 149 secured respectively to said bars 147 and 148. Each of the stems or plungers 146 has its upper end directly beneath one of the digit key levers 42 so that when any of said key levers is depressed it will operate one of said stems. Each numeral key lever has a small metal plate 150 on its under edge to coöperate with the stem 146. Said stems are preferably made round and capable of turning in their bearings in the bars 147 and 148, and said stems are controlled both as to their longitudinal motion and as to their turning motion by springs 151 coiled about the stems 146 and each at its lower end connected with the bar 148 and at its upper end with the hub 152 of the cam 145, which hub is secured upon the stem 146 by means of a set screw 153. The spring 151 is under tension to move the stem longitudinally upward and also to turn it in such a direction as to move the cam 145 toward the front of the machine. The upward motion of the stem 146 under the impulse of said spring 151 is limited by a collar 154 secured, as by a set screw, to the lower end of said stem and normally pressed against the under side of the bar 148.

The tendency of the spring 151 to turn the stem 146 is resisted by an arm 155 projecting toward the rear from said stem and guided by a vertical guide pin 156, which pin is one of a series of similar pins depending from a cross bar 157. As here shown, the cam 145 and the arm 155 are branches of the same piece of sheet metal which is suitably stamped out and bent and secured to the hub 152. The disposition of the cam 145 is such that when the stem 146 is depressed said cam moves the arm 141 toward the left, the pressure of said arm 141 against the cam being resisted by the arm 155 pressing against the pin or guide 156. If necessary, some of the push rods 57 of the tabulator may be suitably bent to avoid conflict with the stems 146.

The motion of the digit selecting bars 125 is slight and it is necessary that it be substantially uniform in extent for all key strokes. The extent of motion or dip of the typewriter keys is relatively great and it is also variable. The mechanism of the typewriting machine is not designed for any great precision in the matter of the length of the key stroke. There are slight differences of leverage in these machines and all of the parts connected with the key are more or less flexible so that the key goes down farther when it is struck hard than it does when struck lightly and some keys will go down farther than others with the same applied power of stroke. Operating the arms 141 by cams enables me to equalize in the digit selecting frames the inequalities of motion of the typewriter keys, and said cams also have other advantages which will appear in the course of the description. In the present instance the construction is such that less than the whole extent of key depression is utilized in the rocking of the arms 141 so that the operation of the setting-up mechanism in the computing machine is completed before the key completes its down stroke. For reasons which will be in part apparent at this stage of the description and which will be more apparent when other parts of the mechanism shall have been described, it is desirable that the arms 141 escape or snap off from the cams 145 before said cams and the typewriter keys complete their down stroke. To this end the cam as seen in left-hand side elevation in Fig. 2 is inclined downward and toward the front of the machine and the relation between this incline in the cam and the arm 141 is such that in the first part of the down stroke of the cam, said arm is moved toward the left but, before the completion of said down stroke the cam moves off of the end of the arm and the arm is free to snap back to normal position without waiting for the return stroke of the key. It has been mentioned that the arms being screwed into the hubs 142 enable the length of said arms to be adjusted by screwing said arms in or out. It is in order to regulate the precise instant of escape of the arm from the cam that this adjustment is made. By this means the right amount of motion can be imparted to the digit selecting frames, irrespective of the dip of the typewriter keys. In case it is found that the frame is not moved far enough the arm can be adjusted to increase its length with the result that it will remain longer in contact with the cam and be forced farther to the left at the key stroke. It will be perceived that the arm 141 will snap back toward the right while the cam 145 is in its depressed position. The end of said arm 141 is thus moved directly in front of the flat face of the cam. When said cam rises said flat front face thereof, rubbing against the end of the lever arm, causes the cam to be moved toward the rear of the machine, turning the stem 146 against the tension of its spring 151 until said cam has reached the point where its lower end passes over the top of the arm 141, when said cam snaps back to normal position in which it is arrested by the arm 155 striking the pin 156. The snapping off of the arm 141 from the cam 145 has important advantages in connection with the denomination selecting mechanism, which advantages will appear in the course of the description of said mechanism.

As will be understood by reference to Fig. 4, the cams 145 lie at the left of the stems 146 and the arms 155 extend toward the rear from said stems. The construction is such that, if the stems be turned by moving the bar 157 and with it the pins 156 and arms 155 toward the right, the cams 145 will be moved toward the rear of the machine to such a position that they will not strike the arms 141 and the numeral keys will therefore be operatively disconnected from the computing mechanism. To this end the bar 157 is made so that it can be slid lengthwise, said bar being mounted in a notch 158, Fig. 2, in the plate 2 and held in position by a shouldered and headed screw 160. At its left-hand end said bar 157 is formed with a slot 161, Fig. 4, which is engaged by a shouldered and headed screw 162 threaded into a bracket 163 suitably secured to the frame plate 1. The motion of the bar 157 toward the left under the impulse of the several springs 151, is limited by an adjustable stop screw 164 threaded through the plate 1. In order to move the bar 157 toward the right to disconnect the adding mechanism from the typewriter keys, the right-hand end of said bar is prolonged somewhat beyond the plate 2 where it is provided with a pin 165, which pin is engaged by an open-ended slot in the end of a disconnecting lever 166, which lever has a disconnecting handle 167 formed on its forward end, Fig. 2. The lever 166 is pivoted at 168 to a post 170 projecting toward the right from the frame plate 2 and said lever may be provided with a restoring spring 171.

In order to guide the forward end of the disconnecting lever 166 and to hold said lever in either of its two positions, a guide plate or bracket 172 is provided, Figs. 3 and 4, said bracket being secured to the plate 2 by means of screws 173 and projecting toward the right from said plate. The lever 166 passes through an elongated slot 174 in said bracket and the lower wall of said slot is formed with two notches 175 and 176 into one or the other of which, depending upon the position of the lever, an ear 177, bent downward from said lever, is adapted to engage. Said ear is yieldingly held in one or the other of said notches by means of a flat spring 178 secured to the upper side of the lever 166 and under tension against the upper edge of the slot 174, the tension of the spring therefore tending to press the lever downward to cause the lug 177 to engage in one of the notches. The lever 166 stands in the position shown in Fig. 4, when the machine is connected up for computing and when it is desired to disconnect the machine the forward end of the lever is lifted against the tension of the spring 178 to raise the lug 177 out of the notch 176 and said lever is then moved toward the left until said lug engages the notch 175.

The denomination selecting mechanism includes a series of frames which may be termed denomination selectors. Each of said frames includes a vertical rod or bar 180, Fig. 6, which at its ends is secured to the free ends of arms 181 and 182, said arms projecting horizontally and almost rearwardly from a vertical rock shaft 183 which at its upper end is journaled in a transverse frame bar 184 and at its lower end in a similar bar 185, said frame bars being rigidly secured at their ends to the frame plates 1 and 2. The bar 180 is connected with each of the nine digit-setting levers 124 that pertain to a single denomination. As here shown each of said levers is formed at its rear end with an open slot that embraces the rod 180. It will thus be seen that each of said levers 124 is a floating lever pivotally connected at two points with two movable devices, each of said levers being connected at its end with a denominational bar 180 and at its middle with a digit bar 125. As shown in Fig. 2 each of the levers 124 has its forward end opposite the end of one of the pins 83 of the associated register wheel 74. As shown in Fig. 4, the free ends of these levers stand a substantial distance to the left of the ends of said pins. In Fig. 9 two register wheels are shown and one digit bar 125 and two denomination selecting frames including two of the bars 180; and also several of the levers 124 are shown. In said figure the illustrated digit bar 125 is shown in operated position and the right-hand one of the denomination selecting frames is also shown in operated position, the left-hand one of said frames being in normal position. The extreme left-hand one of the levers 124, as said levers appear in said Fig. 9, is connected with an unoperated digit bar 125 which lies below the bar shown. This extreme left-hand lever 124, being connected with an unoperated digit bar and with an unoperated denominational frame, is in normal position. The next lever 124 has its rear end connected with an unoperated denominational frame and its middle connected with the operated digit bar. It will be seen that this lever is partially operated but not to a sufficient extent to strike one of the pins 83. Of the two levers 124 which appear between the two wheels 74, the left-hand one is connected with an unoperated digit bar but its rear end is connected with the operated denominational frame. It will be seen that this lever has been partially operated but not to a sufficient extent to set one of the pins 83. The next or extreme right-hand lever 124 that appears in the figure is connected both with the operated digit bar and also with the operated denominational frame. Its middle point has been moved a short distance to the right which alone would be insufficient to completely operate it; and its rear end has been moved a short distance toward the left which alone would be insufficient completely to operate said lever. This lever having, however, been subjected to both these motions is completely operated and has pressed its pin 83 to operated position. From the above description of Fig. 9 it will be perceived that if one of the digit bars 125 and one of the denominational bars 180 be operated simultaneously that all of the levers 124 connected with the operated digit bar 125 will receive a partial operation and all of the levers 124 connected with the operated denominational bar 180 will also receive a partial operation and that the one lever 124, which is connected both to the operated digit bar and also to the operated denominational bar, will receive a complete operation sufficient to cause it to set its pin 83. The denominational frames 180, 181, 182, 183 are each restored to normal position by means of a spring 186 coiled about the lower end of the shaft 183 and connected at one end with one of the arms on said shaft and at the other end with the frame bar 185.

In order to cause the wheel 74 in which the pin 83 has been set in the manner above described to be turned when the operating shaft 75 is turned, it is necessary to reset to inoperative position that pin 83 in said wheel which was formerly in its operated position and in engagement with the stop 100. To this end there is provided a series of resetting levers 187, Figs. 2, 4, 6 and 9. These are levers of the first order pivoted at 188 on the upper side of the bar 120. Each of these levers lies adjacent the right-hand face of the associated register wheel and its rear end is connected by a pin and slot connection 190 with a forward end of a lever arm 191 which, as here shown, is integral with the arm 182 of the corresponding denomination selecting frame. The construction is such that when said frame is rocked to move the bar 180 toward the left, the pin 190 is moved toward the right and the free end of the lever 187 is moved toward the left as shown in Fig. 9, thus resetting the formerly operated pin 83 and leaving the wheel 74 free to be turned until arrested by the newly set pin 83. The register wheel of highest order has no setting levers associated therewith, said wheel being turned only by transfer. This wheel has, however, a resetting lever 187 which is controlled by a spring 189, Fig. 4, for use in setting the register to zero, in the manner to be described hereinafter.

The denomination selecting frames above described are operated by the numeral keys 43 under the control of the typewriter carriage by novel means which will now be described. Each of the denomination selecting frames has an arm 192 projecting therefrom toward the right, as best shown in Fig. 6, said arm in the present instance being integral with the arms 182 and 191. To each of said arms 192 there is connected the forward end of a horizontal link 193, said links extending toward the rear of the machine, as shown in Figs. 1, 4 and 22, and at their rear ends said links are pivoted to arms 194 depending from a series of transverse rock shafts 195, each pivoted at its ends on pivot screws 196 threaded through the frame plates 1 and 2. Each of said rock shafts has depending therefrom a second arm 197 to which is connected the forward end of one of a series of rearwardly extending links 198. The arms 194 and 197 are mounted on the shafts 195 in a novel and advantageous manner shown in Fig. 23. At the point where one of said arms is to be placed, the shaft is formed with a peripheral groove 199, and said shaft is also flattened on one side. The arm is stamped out of sheet metal in the form shown in Fig. 23 to fit into the peripheral groove, and with a branch 199ª bent to one side to permit of the arm being put in place as shown. When the arm has been placed as shown in Fig. 23, the branch 199ª is bent across the flattened part of the shaft, as shown in Fig. 22. It will be seen that by the groove and the flattened part, the arm is held rigidly on the shaft and that it cannot turn on the shaft. The links at their rear ends are connected, as best shown in Fig. 1, with a series of bell cranks 200 which, as here shown, are pivoted on a wire 201 seated in a transverse slot in a framepiece or bracket 202 suitably secured to the rear plate 6 of the computer framework.

It will be noted from an inspection of Fig. 22 that that link 193 which is at the extreme right-hand side of the series of links, is connected with the rear one of the rock shafts 195, which rock shaft is connected with the extreme left-hand one of the links 198, and also that the second link 193 from the right is connected with the second link 198 from the left, and so on. In short, the order of the links, in a right and left-hand direction, is reversed by the series of rock shafts 195. This reversal, as will be more clearly understood from the following description, is on account of the fact that the typewriter shown is of that sort in which the paper is mounted on the carriage and the printing mechanism and computing mechanism are stationary. This being the case, the extreme right-hand digit of a number is written when the carriage is in its left-hand position. By an inspection of Fig. 22 it will be noted that in the present instance the second link 193 from the left happens to come in its proper relation to the other links without the necessity of any intervening rock shaft 195. This particular link therefore is carried clear to the back of the machine where it is connected with one of the bell cranks 200. It will, of course, be understood that any other suitable means may be employed for reversing the order of the links 193 and 198.

The bell cranks 200 have each a rearwardly directed arm that projects through a transverse slot 203 in the plate 6 and each of said rearward arms has connected thereto a link 204 which extends upward at a forward inclination, as shown in Fig. 1, the upper ends of all of said links being connected with a series of bell cranks 205, as best shown in Fig. 11. Said bell cranks 205 are pivoted on a rod 206 mounted at its ends in the stationary side bars 207, Fig. 10, of a frame, which frame also comprises a cross bar 208 and a rod 209 which serves as a stop for the upright arms of the bell cranks. The bars 207 extend from front to rear and they lie on top of the tabulator supporting bar 64. The bar 208 lies behind and beneath said bar 64 and the whole frame is detachably clamped to said bar by one or more set screws 210. Each of the bell cranks 205 is formed with a hub 211, Fig. 10, and the thickness of the hub and lever is just equal to a letter space of the carriage. For example, if the carriage makes ten steps to the inch, then each of these levers and its hub will be one-tenth of an inch thick so that a part mounted on the carriage will step from one lever to the next as the carriage moves through a computing zone. The frame 207, 208 is made wider than the series of levers 205 and a spring 212 is coiled about the rod 206 and is compressed between one of the bars 207 and the extreme right-hand one of the hubs 211. In order to provide for punctuation I employ one or more spacers 213, the form of which is best shown in Figs. 10 and 13. Said spacer consists of a plate of metal of a thickness equal to one letter space step of the carriage and with its forward end beveled or wedge-shaped, as shown at 214, and having an open-ended slot 215 arranged to embrace the rod 206. This spacer is adapted to be inserted between any two of the bell cranks 205, as shown in Figs. 10 and 11, and thus to force two of said bell cranks apart a distance equal to one letter space of the carriage. In Fig. 10 such a spacer is shown inserted between the second and third bell cranks from the left, thus providing a space for the decimal point in writing sums in United States money. Obviously one or more spacers can be used if desired so as to point off numbers with decimal points or commas or both in any desired manner and by removing all of the spacers the spring 212 will force all of the bell cranks into contact and the machine will then be set for computing numbers written solid without any space for punctuation.

The frame 207, 208 is mounted a little to the left of the frame 56 of the denominational tabulator, as appears in Figs. 10 and 12. The device carried by the typewriter carriage for operating the levers 205, consists of a connecting device which in the present instance is in the form of a pin 216 mounted in the off-set arm 217 of a bracket 218 which is mounted on the tabulator column stop bar 50. As here shown the bracket 218 is made with an opening in its rear side, said bracket embracing the bar 50 at the top and bottom of said bar and having a flange 219 adapted to engage the rear edge of the bar 50. Said bracket 218 is secured in position by a set screw 220 engaging the upper surface of the bar. The bracket can be removed at any time by loosening the set screw 220 and slipping it off toward the front of the machine, and said bracket can be adjusted lengthwise of the bar 50 by loosening said set screw and sliding the bracket along the bar. The pin 216 is horizontally disposed in a front and rear direction, and it passes loosely through two ears 221 of the bracket arm 217. Said pin is formed or provided with an enlargement 222 between which and the rear one of the ears 221 there is compressed a spring 223 which normally holds the pin in the forward position shown in Fig. 11.

The off-set arm 217 is provided for the purpose of enabling this connecting device to be adjusted on the bar 50 by reference to the tabulator column stop 52, said arm 217 being of a length suitable for compensating for the difference in position between the denominational stops 53 and the bell cranks 205, said bell cranks being at the left of said denominational stop. The construction is such that the column stop 52 can be adjusted by inserting it in the desired slots 51, and the bracket 218 can then be adjusted by sliding it along the bar 50 until it is arrested by contact with said column stop.

It will be perceived that as the carriage moves step-by-step through that particular zone in which the pin 216 moves across the series of bell cranks 205, if said pin 216 be moved toward the rear it will operate that one of the bell cranks 205 which is appropriate to the letter space position in which the carriage stands at the time and that said bell crank will, through the link 204, bell crank 200, link 198, rock shaft 195, and link 193, operate one of the denomination selecting frames. The means for operating the pin 216, consists of an operating bar 225 which extends across the series of bell cranks 205 in front of the line of travel of the forward end of the pin 216 and which bar 225 is operated by a universal bar which in turn is operated by all of the numeral keys. The operating bar 225 is here shown as made of a piece of sheet metal having arms 226 rigidly mounted on the projecting ends of a rock shaft 227 which is pivoted in the extreme forward ends of the arms 207. Said rock shaft is shown provided with a collar 228 secured thereto by a set screw 230, and to said collar is secured one end of a returning spring 231, which spring is coiled about the shaft 227 and at one end is connected with one of the bars 207, the tension of the spring being exerted to hold the bar 225 in its forward normal position shown in Fig. 11. One of the arms 226 is extended toward the rear of the machine to form a lever arm 232 to which is connected the upper end of a link 233 which at its lower end, as best shown in Fig. 1, is connected with one arm of a bell crank 234, which arm projects rearward through a suitable opening in the plate 6. The bell crank 234 is pivoted at 235 to an arm of the bracket 202 and said bell crank has a downward extending arm to which is connected the rear end of a link 236, the forward end of which, as best shown in Figs. 2 and 4, is connected with a transverse arm of a bell crank 237 which is pivoted at 238 to a transverse frame bar 240 in the lower part of the computer frame, said frame bar being rigidly connected at its ends to the side plates 1 and 2. It will be seen that the bell crank 237 lies beneath the series of lever arms 141, which lever arms are operated by the numeral keys of the typewriter. Said bell crank has a forwardly directed arm from which a pin 241 projects into a slot formed in a transverse universal bar 242. This universal bar is arranged to be moved lengthwise toward the left by any of the lever arms 141 that may be operated. To this end said universal bar is riveted at its ends to upright flat springs 243, Figs. 2 and 4, which springs are secured at their lower ends by screws 244 to brackets 245 projecting from the frame plates 1 and 2. The springs 243 normally hold the universal bar 242 in its right-hand position but leave it free to be moved toward the left when a numeral key is depressed. The connection between said universal bar and the lever arms 141 consists of a series of brackets or ears 246 projecting upward from the bar 242, each of said ears standing just at the left of one of the arms 141. The universal bar 242 may be conveniently stamped out of sheet metal in which case the ears 246 may be twisted around as shown to bring their flat sides against the arms 141 and said ears can be adjusted by bending them. It will be perceived that when any of the arms 141 is swung toward the left, the bell crank 237 will pull the link 236 toward the front of the machine and the operating bar 225 will be swung toward the back of the machine. If the typewriter carriage is in a computing zone at the time, the pin 216 will be in position to be operated by said bar 225 and said pin will operate one of the bell cranks 205 and, therefore, one of the denomination selecting frames. It will thus be seen that when a numeral key is operated at the time when the typewriter carriage is in a computing zone, that one of the digit bars 125 is moved a short distance toward the right and one of the denominational bars 180 is moved a short distance toward the left, thus setting up in the computing mechanism the digit corresponding to the operated key and in the denomination corresponding to the position of the typewriter carriage at the time.

It will be perceived that the spring 231 acts directly on the frame of the operating bar 225 and that its tension is conveyed through a train of links and levers to the universal bar 242, tending to move said universal bar toward the right, which motion is resisted by the arms 141 and which may, if preferred, be limited by any suitable stop. This whole train of mechanism, therefore, from the universal bar 242 up to the bar 225, is under tension so that before the universal bar is operated the lost motion and the looseness in said train of connections is already taken up. A similar thing is true of the train of connections from each of the bell cranks 205 down to the frames including the rock shafts 183 which are operated by these bell cranks. Each of said rock shafts is provided with a restoring spring 186 and the tension of this spring is exerted throughout the entire train of connections up to the bell crank 205, where said tension is resisted by the stop bar 209. This entire train of connections is therefore under tension and has all of its lost motion and looseness taken out. All of the links in these several trains of connections may be provided with ends 247 into which the links are screwed, which ends serve as devices to pivot the links to the levers with which they are connected, and the lengths of these links can be adjusted by screwing the said ends in or out on the links. The motions with which we are here dealing are short ones but they can be made with a considerable and sufficient degree of precision by means of the tension system referred to. In each train of connections there is a spring at one end of the train and resistance at the other, and said train of connections is operated at the end at which the resistance is placed.

It will be perceived that a computing zone is determined in the typewriter by suitably adjusting one of the column stops 52 and adjusting the bracket 218 in harmony with and by reference to said column stop, and that numbers written in a column by the aid of the denominational tabulator will be added on the computing mechanism. Any desired number of columns can be located by using a plurality of the connecting devices described. In Fig. 10 I have shown two of these devices, or sets of devices, mounted on the typewriter. Under these conditions it will be seen that all of the numbers written in all of the columns will be added in the computing mechanism.

The carriage connections above described have a number of important advantages. It will be noted that said connections do not impose any resistance at all on the travel of the carriage, the only thing mounted on or in any way connected with the carriage being the bracket 218, which of course is a very light affair and which, during the travel of the carriage, is not connected with any other part of the computing mechanism nor in contact with any relatively fixed part. The register wheels are beneath the typewriter at the front of the machine and if it were necessary to adjust anything to said wheels by means of the carriage, said adjustment would of necessity have to be made through rather a long train of connections and these connections would have to be of rigid construction and free from lost motion in order for the adjustment to different denominational positions to be made with sufficient accuracy. The ordinary letter space step of a typewriter carriage is only one-tenth of an inch and it is undesirable to have to adjust some other mechanical part by the step-by-step motion of the carriage where said part is situated at any considerable distance from the carriage. It will be noted that in the present instance the carriage controls the bell cranks 205 directly or with no other intermediate devices than the pin 216 which is mounted in the rigid bracket 218, which bracket is rigidly secured directly to the carriage. It will also be perceived by an inspection of Fig. 11 that there is an appreciable space in a front and back direction between the ends of the pin 216 and the bell cranks 205 at the back and the bar 225 at the front, thus doing away with any danger of said pin striking either of said parts as the carriage moves, and also with the necessity for any great accuracy in said parts to prevent such interference. It will be seen that this method of denomination selection from the typewriter carriage is unusually direct and free from liability of error. It will also be noted that when the adding mechanism is rendered inoperative by the numeral keys, by means of the disconnecting handle 167, that the denomination selecting mechanism is not operated, said denomination selecting mechanism being operated, when the computing mechanism is connected up, through the digit selecting mechanism. It will also be noted that the whole work of the keys is done instantly on the down stroke of the key and is completed before the end of said down stroke, so that the pin 216 is withdrawn from the bell cranks 205 before the carriage stops. To have said pin so withdrawn is one of the principal reasons for providing the snap-off of the lever arms 141 from the cams 145.

I prefer to place a guard 248 over the links 204 and 233, as shown in Fig. 1. This guard may be made of sheet metal in any suitable form and may be secured to the plate 6 by screws 249 and to the top plate of the typewriter in any suitable manner.

The operating mechanism comprises an operating handle 250 mounted on a crank arm 251, the hub 252 of which is mounted on a short rock shaft 253 to which, as best shown in Fig. 15, it is secured by a screw 254, the hub fitting over the squared end of the shaft. Said shaft has a reduced inner end 255 that is journaled in the frame plate 1 and said shaft is also journaled in a bracket 256 secured by screws 257, Fig. 1, to the left-hand face of the side plate 1, said bracket being made in the bow shape best indicated in Fig. 5. The principal function of the handle 250 is to impart to the shaft 75 approximately one complete rotation in the direction of the arrow in Fig. 14 after the setting up of each complete number by the mechanism which has been described hereinbefore. To this end said shaft 75 projects through the frame plate 1 where it has a pinion 258 mounted thereon and rigidly connected therewith as, for example, by means of a pin 260. The pinion 258 meshes with a gear 261, which gear consists of a toothed ring mounted on a disk 262, which disk is mounted on the shaft 253 and is secured to said shaft rigidly by a long set screw 263 threaded through a radial hole 264 and at its inner end engaging the shaft. The disk 262 and toothed ring 261 constitute parts of a roller clutch. Said disk is formed with one or more notches or cut-outs 265 in which, or in each of which, there is mounted a roller 266 which is pressed toward the narrow part of the cut-out by a flat spring 267 having the form best shown in Fig. 15. In order to prevent this spring from becoming displaced, the disk 262 is formed with a lip 268. The gear or toothed ring 261 is maintained in position on the disk 262 by guard plates 270 of slightly greater diameter than the disk 262 and secured to said disk by screws 271. The whole construction is such that when the handle 250 is pulled toward the front of the machine the roller clutch causes the ring 261 to turn with the disk 262 but when the handle is restored to normal position the clutch can slip on the inside of the ring 261, leaving said ring stationary. This restoration of the handle is effected by means of a spring 272, Fig. 15, coiled about the shaft 253 and connected at one end to said shaft and at the other end to a pin 273 projecting from the plate 1.

It is highly desirable to prevent even slight backward motion of the shaft 75, as such motion would disturb the relation of the pins 83 to the setting levers 124. To this end a roller clutch is connected with said shaft 75, which roller clutch is in all respects similar to the one on the shaft 253 except that the ring 274 thereof is not toothed but is formed in its periphery with a single notch 275, Fig. 17, which notch is engaged by a pin 276 projecting inward from the plate 1. This clutch comprises a disk 277 secured to the shaft 75 by a set screw threaded into a hole 278, and said disk has one or more rollers 280 and springs 281 similar to the rollers 266 and springs 267 of the other clutch. The ring 274 is retained in position by means of guard plates 282 secured to the disk 277 at 283. The disk 277 is formed with notches 284 like the notches 265 of the other clutch and said notches are formed with the lips 285 similar to the lips 268 but said lips 285 are more clearly shown in Fig.

17 than the lips 268 are in the other figures of the drawing. The construction of both of these clutches is made somewhat clearer by Fig. 17. The one on the shaft 75 is so arranged as to allow said shaft to turn toward the back of the machine, the disk 277 slipping freely in the ring 274, but said ring, which is held stationary by the pin 276, preventing the disk and shaft from turning at all in the opposite direction.

It will, of course, be understood that the two roller clutches described are the mechanical equivalents of pawl and ratchet mechanism but they have advantages over ordinary pawl and ratchet mechanism in the respect that the clutch on the shaft 75 prevents even slight backward rotation of the shaft 75 and also in the respect of noiseless operation. It will be understood that the principle of this computing mechanism is such that the extent of motion imparted to the shaft 75 does not have to be defined with any great accuracy. It has been explained in the prior Patent No. 852,016, above referred to, that this shaft can be a constantly rotating shaft as far as the adding principle is concerned and that when it is operated intermittently, as in the present case, all that is necessary is that it be given a sufficient extent of motion to turn one of the register wheels through nine spaces and a sufficient additional extent of motion to take care of any possible additional operation of the register wheels by transfer. A complete rotation of the shaft 75 is more than sufficient for these purposes, but any additional extent of rotation beyond what is absolutely necessary, does no harm.

The backward rotation of the handle 250 is arrested by a pad 286, Fig. 4, said pad being formed of any suitable cushioning material and being retained in place by a bracket 287 secured by screws 288 to the side plate 3 of the machine.

In order to correct the error, in case a wrong key has been struck or in case for any other reason the wrong pins 83 have been set, an error key 290 is provided, said key being mounted on a stem 291, Figs. 4, 5 and 21, for operation by pushing said key toward the rear. The stem 291 is pivoted at its rear end to an arm 292 projecting toward the right from a vertical rock shaft 293 which, as best shown in Fig. 5, is pivoted in brackets 294 projecting from the frame plate 2. A restoring spring 295, Fig. 21, is coiled about the shaft 293, and the tension of said spring is exerted to hold the key 290 normally in its forward position. At is upper end the shaft 293 has an arm 296 projecting therefrom toward the rear of the machine and the hub 297 of said arm, bearing against the upper bracket 294, prevents longitudinal movement of the shaft 293 downward. When the key 290 is operated the arm 296 presses toward the left a pin 298 projecting from a transverse reciprocatory bar 300, which bar is slidably mounted on the tops of the plates 1 and 2 by means of screws 301 passing through slots 302 in said bar and threaded into the plates 1 and 2. The bar 300 is normally held pressed toward the right by means of a flat spring 303, Fig. 5, secured by a screw 304 to the inner side of the plate 1 and engaging in a notch in said bar 300, the motion of the bar being limited by the screws 301 and slots 302. The slide bar 300, as best shown in Fig. 21, is formed with a series of slots cut in its front and rear edges and into said slots are inserted the suitably formed upper ends of a series of restoring plates 305. These plates have a curved outline of such character that each plate stands opposite to the nine pins 83 of one of the register wheels 74, which pins are in position to be operated by the setting levers 124, as will be understood by reference to Fig. 2. That is to say, each of the plates 305 stands a little to the right of one of the register wheels 174 and opposite to the nine pins 83 which are behind and above that one of said pins which is in position to engage the stop 100. The construction is such that if some of the pins 83 have been set by the setting levers 124, and if, before the operating handle 250 has been worked, the error key 290 is pressed toward the rear of the machine, the bar 300 will be moved toward the left, carrying with it all of the plates 305 and said plates will reset to inoperative position any of the pins 83 that may have been set by the levers 124.

When a pin was set by one of said levers 124, the formerly operated one of said pins 83 was also reset to normal position by the lever 187 that serves that particular register wheel. In order to correct the erroneous setting of the wheels, therefore, it is necessary not only to reset the erroneously set pins 83 but also to restore to operated position the pins 83 at the bottom of the wheels and next to the stops 100. To this end the shaft 293 has on the bottom thereof an arm 306, the hub 307 of which is in contact with the lower bracket 294 and prevents upward motion of the shaft 293. The arm 306 is adapted, when the error key is operated, to press toward the left a pin 308 projecting from a transverse slide bar 310 which extends across the machine, being mounted, as best shown in Figs. 2 and 5, on shouldered and headed screws 311 threaded into the underside of the frame bar 120, said screws 311 passing through longitudinal slots in the bar 310. Said bar 310 is formed with a series of ears 312 projecting from its forward edge in such position that when said bar is moved toward the left by the error key, each of said ears 312 engages the downward extending arm 313 of one of the levers 117, the bent-off ears 122 of which, it will be recalled, are adapted to press to operated position those pins 83 which are next to the stops 100. The construction is such that all of these pins are set to operated position whenever the error key is operated. It will be seen that the result of operating this error key is to restore all of the pins 83 to the positions they occupied at the end of the last preceding operation of the handle 250. Any suitable spring 314 may be applied to the bar 310 to restore it to normal position. The correcting mechanism above described resembles that shown and described in a pending application of mine, in which said application said mechanism is claimed more broadly than in the present application.

The zero setting mechanism for resetting the register wheels to begin a new calculation, includes a zero key 315. In the present instance, this key is shown mounted at the right-hand end of the computing machine and arranged to be operated by pushing it toward the left. The operation of setting the wheels to zero consists in pushing this key toward the left and while holding it in its operated position, giving an operation to the handle 250; then releasing the key and giving another operation to said handle. The key 315 is shown mounted on a stem 316 which is slidably mounted in the casing plate 4 and whose inner end is pivoted to a lever 317 which at 318 is pivoted to a bracket 320 projecting from the side plate 2, as best shown in Figs. 4 and 20. The lever 317 lies in an approximately front-to-rear direction and its rear end has an ear 322 through which is threaded an adjustable screw 323 which is adapted, when the key 315 is operated, to strike against an ear 324 at the upper end of a vertical lever 325, which, at 326, is pivoted to a bracket 327 projecting from the frame plate 2. The upper end of the lever 325 is adapted, when the zero key is operated, to strike against the end of the sliding bar 300 and move said bar toward the left and with it all of the plates 305. This is merely a precautionary measure to insure that, in case any key has been struck since the last operation of the handle 250 resulting in the setting of any of the pins 83, said set pins will be restored to normal position.

The lower end of the lever 325 engages an arm or lug 328 projecting from a transverse slide bar 330 which, as best shown in Figs. 2 and 20, is slidably mounted on brackets 331 projecting toward the rear from the frame bar 120. The bar 330 is mounted for limited longitudinal motion by means of shouldered and headed screws 332 passing through slots 333 in the bar 330 and threaded into the brackets 331. As best shown in Figs. 2 and 20, the bar 330 has a series of pins 334 mounted on the upper side thereof and adapted to engage the rear arms of the several levers 187. The construction is such that when the zero key is operated the bar 330 is moved toward the right, causing an operation of all of the levers 187 and resetting to inoperative position all of those pins 83 that were in engagement with the stops 100, thus leaving the register wheels free to turn.

The forward end of the lever 317 operates a transverse slide bar 335, said lever as here shown engaging between two ears 336. Said ears 336 constitute parts of a block or plate of metal 337 secured by a screw to the right-hand end of the bar 335. Said bar is slidably mounted in suitable openings in the frame plates 1 and 2 into which it is inserted before the piece 337 is secured in place. Said bar is provided with a flat returning spring 338, Figs. 2 and 5, engaging a pin projecting from the bar and this returning spring is also the returning spring for the key 315.

The bar 335 carries a series of levers 340, one just to the left of each of the register wheels, each of said levers being controlled by a spring 341 which normally holds the lever pressed against a stop pin 342. As shown in the present instance, the springs 341 are each connected at one end with a lever 340 and at the opposite end with the prolonged pivot screw 344 of the next lever 340 to the left. Each of said levers has an arm 345 projecting therefrom between two adjacent register wheels and said arm 345 has an ear or lug 346 bent off therefrom toward the right. Each of the register wheels has in the web thereof two openings 347 into which the lugs 346 are adapted to be pressed. The construction is such that when the key 315 is pushed toward the left, the bar 335 is moved toward the right and each of the lugs 346 is pressed against the web of one of the register wheels by the tension of its spring 341. When the handle is pulled and the shaft 75 is turned, each of the register wheels turns until one of its openings 347 registers with the lug 346, which lug immediately snaps into the opening and arrests the wheel. When the lug 346 snaps into the opening 347 the arm 345 strikes one of the pins 83 and presses said pin to operated position, as will be understood by comparing Figs. 4 and 2. The effect of the operation just described of pressing the key 315 and pulling the handle, will be, therefore, to aline all of the register wheels in the same position and to set one of the pins 83 in each of said wheels. The key 315 is then released and the bars 335, 330 and 300 are all restored to normal positions. The handle 250 is then again operated which brings all of the set pins 83 around to position to be arrested by the stop 100 and its associated devices. By this time, however, each of the wheels has been turned through more than a half of a rotation. Each of the transfer levers 101 has therefore been moved to its operated position shown in Fig. 18 and the stop 100 is out of the path of the pins 83. Those pins 83 which have been set by the lever arms 345, will therefore pass the stop 100 and said pins will operate the levers 111 with the result that the next succeeding pin 83 will be set in each wheel. The openings 347 are so placed on the register wheels as that the operation above described will bring said wheels to zero.

In one respect the operation just described does not apply to the wheel of lowest order. The stop for this wheel is not movable and the pin that is set by the lever arm 345 will therefore be arrested. In this particular wheel, therefore, the openings 347 are disposed somewhat differently from those in the remaining wheels. The zero setting mechanism just described, resembles in many respects the corresponding parts in my prior patent and prior application, both hereinbefore referred to, and the claims in said zero setting mechanism in the present case, are limited to features not shown in said prior patent and application.

Preferably the forward part of the computing mechanism is covered by a casing plate 350, Fig. 2, which is here shown as of curved form and secured to the cross bars 5 and 184 by screws 351. Said plate is formed with suitable sight openings 352 through which to read the register. It will of course be understood that other cover plates can be applied to the mechanism if desired.

It will also be obvious that many changes can be made in the details of construction and arrangement without departing from my invention.

What I claim as new and desire to secure by Letters Patent, is:—

1. In a computing machine, the combination of a group of keys, a series of registering elements, a series of sets of digit determining devices, one set for each denomination, a series of sets of setting devices for said digit determining devices, a series of digit selectors, a series of denomination selectors, means whereby an operation of any of said digit selectors gives a partial operation to a number of said setting devices, means whereby an operation of any of said denomination selectors gives a partial operation to a set of said setting devices, the simultaneous operation of a digit selector and the denomination selector giving a complete operation to one of said setting devices, means whereby each of said keys when operated operates the corresponding one of said digit selectors, and means whereby any of said digit selectors when operated operates one of said denomination selectors.

2. In a combined typewriting and computing machine, the combination of a group of numeral keys, a typewriter carriage, a series of registering elements, a series of cams operated by said keys and each constructed to complete its action before its key finishes its down stroke, digit selectors operated by said cams, denomination selectors also operated by said cams under the control of said typewriter carriage, and a series of sets of digit determining devices, said devices adapted to be set by the joint operation of one of said digit selectors and one of said denomination selectors.

3. In a combined typewriting and computing machine, the combination of the printing keys of the typewriter including numeral keys, the typewriter carriage, a series of registering elements, and means whereby said registering elements are controlled by said keys and carriage, said means including a series of stems mounted in position to be operated by said numeral keys, cams mounted on said stems, devices operated by said cams, guides for said stems, and means for moving said guides and thereby turning said stems to render said cams inoperative when it is desired to disconnect the computing mechanism from the typewriting mechanism.

4. In a combined typewriting and computing machine, the combination of printing keys including numeral keys and the carriage of a typewriter, a series of stems mounted beneath said numeral keys in position to be depressed thereby, cams mounted on said stems, means operated by said cams for controlling the computing mechanism, a bar having means for guiding said stems, and means for moving said bar and thereby turning said stems to render said cams inoperative when it is desired to disconnect the computing mechanism from the typewriting mechanism.

5. In a combined typewriting and computing machine, the combination of printing keys including numeral keys and the carriage of a typewriter, a series of registering elements, rods movable longitudinally by said numeral keys, means carried by said rods for controlling the computing mechanism, guides for said rods, and means for turning said rods to render said controlling means inoperative.

6. In a combined typewriting and computing machine, the combination of the paper carriage and printing instrumentalities of a typewriter, said carriage capable of a travel materially exceeding the width of a computing column, a set of numeral keys, computing mechanism including a series of register wheels each carrying a series of settable stops, a series of denominational devices extending from said computing mechanism and terminating in a row, an operating bar arranged parallel with said row, means for operating said bar at the key strokes, a device carried directly by said paper carriage and partaking of the whole travel of said carriage and adapted, when said carriage is in a computing zone to transmit motion from said operating bar to said denominational devices selectively, and means coöperating with said denominational devices for setting one of said stops in the register wheel corresponding to the selected denominational device.

7. In a combined typewriting and computing machine, the combination of the carriage and printing instrumentalities of a typewriter, a set of numeral keys, computing mechanism, a set of denominational devices extending from said computing mechanism and terminating in a row, an operating bar arranged parallel with said row, means for operating said bar at the key strokes, a connecting device carried by said carriage and partaking of the whole travel of said carriage and adapted, when said carriage is in a computing zone to transmit motion from said operating bar to said denominational devices selectively, and tabulator mechanism for said typewriter carriage including one or more adjustable column stops, said connecting device being carried by an arm which can be adjusted into contact with the column stop which locates the computing column.

8. In a combined typewriting and computing machine, the combination of a computer frame, a typewriter frame mounted on said computer frame, computing mechanism in said computer frame, printing keys including numeral keys, and a carriage in said typewriter frame, digit selecting devices in said computer frame operated by said numeral keys, a universal bar operated by said digit selectors, an operating bar operated by said universal bar, a set of denomination selectors each having a part adjacent said operating bar, and a connecting device carried by said typewriter carriage and partaking of the whole travel of said carriage and adapted, when said carriage is in a computing zone to transmit motion from said operating bar to said denominational selectors selectively.

9. In a combined typewriting and computing machine, the combination of a typewriter carriage, tabulator mechanism for controlling said carriage, said tabulator mechanism including a column stop bar carried by said carriage and having at least one column stop adjustable thereon, an operating bar, a series of denominational devices arranged in a row adjacent said operating bar, means for operating said operating bar, a connecting device including a part movable transversely to the line of carriage travel, said connecting device being adjustable on said column stop bar and adapted when said carriage is in a computing zone, to transmit the motion of said operating bar to said denominational devices selectively, and computing mechanism controlled by said numeral keys and by said denominational devices.

10. In a combined typewriting and computing machine, the combination of computing mechanism, denominational selective devices including a series of denominational members arranged side by side and coöperating selecting means therefor, said denominational members being pressed together by a spring; and a detachable spacer which can, if desired, be inserted between two consecutive ones of said denominational members to increase the space between said two members for the purpose of punctuation.

11. In a combined typewriting and computing machine, the combination of computing mechanism, denominational selective devices including a series of denominational members arranged side by side and coöperating selecting means therefor; and a detachable spacer which can, if desired, be inserted between two consecutive ones of said members to increase the space between said two members for the purpose of punctuation, and which can be retained in such space to hold said members spaced apart.

12. In a combined typewriting and computing machine, the combination of computing mechanism, denominational selective devices including a series of denominational levers and coöperating selecting means for said levers, a fulcrum rod for said levers, a spacer adapted to straddle said fulcrum device and which can, if desired, be inserted between two consecutive ones of said denominational levers to increase the space between said two levers for the purpose of punctuation.

13. In a combined typewriting and computing machine, the combination of typewriting mechanism including keys for printing numerals and other characters and a carriage, tabulator mechanism comprising a column stop bar having one or more column stops adjustable thereon, a series of denominational stops for coöperation with said column stops, computing mechanism, connections from the numeral printing keys to said computing mechanism, a series of denominational devices for said computing mechanism arranged near said tabulator stop bar, an operating bar near said column stop bar and said denominational devices, an arm detachably mounted on said column stop bar and adjustable thereon, by reference to a column stop, and a movable connecting device mounted in said arm and adapted when said carriage is moved step-by-step through a computing column to transmit the motion of said operating bar to one after another of said denominational devices.

14. In a combined typewriting and computing machine, the combination of typewriting mechanism including keys for printing numerals and other characters and a carriage, tabulator mechanism comprising a column stop bar having one or more column stops adjustable thereon, a series of denominational stops for coöperation with said column stops, computing mechanism, connections from the numeral printing keys to said computing mechanism, a series of denominational devices for said computing mechanism arranged near said tabulator stop bar, an operating bar near said column stop bar and said denominational devices, an arm detachably mounted on said column stop bar and adjustable thereon by reference to a column stop, and a pin slidably mounted in said arm and adapted to convey the motion of said operating bar to one after another of said denominational devices.

15. In a combined typewriting and computing machine, the combination of typewriting mechanism including keys for printing numerals and other characters and a carriage, tabulator mechanism comprising a column stop bar having one or more column stops adjustable thereon, a series of denominational stops for coöperation with said column stops, computing mechanism, connections from the numeral printing keys to said computing mechanism, a series of denominational devices for said computing mechanism arranged near said tabulator stop bar and at one side of said series of denominational stops, an operating bar near said column stop bar and said denominational devices, an arm detachably mounted on said column stop bar and adjustable thereon by reference to a column stop and off-set longitudinally of the stop bar, and a movable connecting device mounted in said arm and adapted when said carriage is moved step-by-step through a computing column to transmit the motion of said operating bar to one after another of said denominational devices.

16. In a computing machine, the combination of a series of registering elements, a set of numeral keys common to all denominations, a set of digit selectors each comprising a rocking frame having an arm, a series of plungers provided with cams for operating said arms, a universal bar having abutments one arranged to be operated by each of said arms and said universal bar being adapted to move lengthwise, and denomination selecting mechanism operated by said universal bar.

17. In a combined typewriting and computing machine, the combination of a series of register wheels, a series of transverse digit bars arranged behind and across said series of register wheels, a series of upright rocking denominational frames, one for each of said register wheels, a series of sets of setting devices operated by the joint action of said digit bars and said denominational frames and controlling said register wheels, levers connected with said digit bars and extending toward the back of the machine, typewriting mechanism including a carriage and numeral printing keys, plungers operated by said keys and operating said levers, and means operated by said keys and controlled by said carriage for operating said denominational frames.

18. In a combined typewriting and computing machine, the combination of a series of registering elements, a set of digit bars arranged behind and across said registering elements and one above another, a series of rocking frames or levers for operating said digit bars, a set of numeral keys, printing devices operated by said keys, means whereby said keys rock said frames or levers, a typewriter carriage movable step-by-step, a universal bar operated by said numeral keys, a series of denomination selectors, an operating bar operated by said universal bar, a connecting device mounted on and partaking of the entire travel of said carriage and operating when said carriage moves step-by-step through a computing column to transmit the motion of said operating bar to one after another of said denomination selectors, and means operated by the joint action of one of said denomination selectors and one of said digit bars for controlling said registering elements.

19. In a computing machine, the combination of a series of register wheels, a series of sets of digit determining devices one set for each of said registering elements, a series of sets of setting devices for setting said digit determining devices, a series of digit bars extending across said series of registering elements and having said setting devices connected therewith, a series of denominational frames also connected with said setting devices, and supporting and guiding means for said digit bars comprising adjustable hangers and arms pivoted in said hangers and supporting said bars.

20. In a computing machine, the combination of a series of registering elements, setting up mechanism, a rotary shaft for operating said registering elements in accordance with numbers set up by said setting up mechanism, a handle arranged to be operated through a part of a turn, a gear wheel operated by said handle and geared to said shaft, a roller clutch between said handle and said gear wheel, said gear wheel constituting one member of said clutch, and a roller clutch between said shaft and a stationary element, said shaft being operated through the first clutch and backward turning of said shaft being prevented by the second clutch.

21. In a computing machine, a register wheel built up of two pieces of sheet metal, one of them formed into a drum having a cylindrical part and a web, and the other being cupped and of circular outline, the circular part of said cupped piece fitting into said cylindrical part of the other piece, and the web of said cupped piece lying against and being secured to the web of the other piece.

22. In a computing machine, a register wheel built up of two pieces of sheet metal, one of them formed into a drum having a cylindrical part and a web, and the other being cupped and of circular outline, the circular part of said cupped piece fitting into said cylindrical part of the other piece, and the web of said cupped piece lying against and being secured to the web of the other piece, a series of registering holes through said two pieces near the periphery of the wheel, and settable pins in said holes.

23. In a computing machine, a register wheel built up of two pieces of sheet metal, one of them formed into a drum having a cylindrical part and a web, and the other being cupped and of circular outline, the circular part of said cupped piece fitting into said cylindrical part of the other piece, and the web of said cupped piece lying against and being secured to the web of the other piece, a driving shaft, and frictional devices mounted on said shaft and coöperating with the webs of said pieces.

24. In a computing machine, a register wheel built up of two pieces of sheet metal, one of them formed into a drum having a cylindrical part and a web, and the other being cupped and of circular outline, the circular part of said cupped piece fitting into said cylindrical part of the other piece, and the web of said cupped piece lying against and being secured to the web of the other piece, a series of registering holes through said two pieces near the periphery of the wheel, settable pins in said holes, a driving shaft, and frictional devices mounted on said shaft and coöperating with the webs of said pieces.

25. In a computing machine, the combination of a wheel, a driving shaft for said wheel, and a frictional connection between said shaft and wheel, said connection comprising a collar secured to said shaft, a spider spring connected with said collar, and a ring pressed against the web of said wheel by said spring, said ring having means to prevent relative rotation between it and the spring.

26. In a computing machine, the combination of a register wheel, a driving shaft for said wheel, and a frictional connection between said shaft and wheel, said connection comprising a collar on said shaft, a spider spring connected with said collar, and a sheet metal ring having ears that embrace the arms of said spider spring, said ring being pressed by said spring against the web of said wheel.

27. In a computing machine, the combination of a driving shaft, a series of wheels mounted on said shaft, and frictional connections between said shaft and the said wheels, said connections comprising a series of collars secured to the shaft and each bearing at one end against the web of one of said wheels, a spider spring connected with the other end of each collar, and a ring pressed by said spring against the web of one of said wheels, said ring having means to hold it in proper relation to said spring.

28. In a combined typewriting and computing machine, the combination of a group of numeral keys, a typewriter carriage, a series of longitudinally movable stems beneath said keys, cams mounted on said stems, digit selectors operated by said cams, the construction being such that said digit selectors snap off of said cams before the completion of the down strokes of the keys, denomination selectors operated by said digit selectors under the control of said typewriter carriage, and a series of registering elements each controlled by the joint operation of one of said digit selectors and one of said denomination selectors.

29. In a combined typewriting and computing machine, the combination of a group of numeral keys, a typewriter carriage, a series of cams operated by said numeral keys, devices operated by said cams, said cams being inclined in one direction in order to operate said devices and being inclined in another direction in order to move off of said devices to release said devices from said cams before the completion of the strokes of said cams, and computing mechanism controlled by said devices.

30. In a combined typewriting and computing machine, the combination of a group of numeral keys, a typewriter carriage, a series of cams operated by said numeral keys, devices operated by said cams, said cams being inclined in one direction in order to operate said devices and being inclined in another direction in order to move off of said devices to release said devices from said cams before the completion of the strokes of said cams, computing mechanism controlled by said devices, and means for effecting a relative adjustment between each of said cams and the associated one of said devices to regulate the point in the stroke of the cam at which it moves off of said device.

31. In a computing machine, the combination of a series of register wheels each carrying a series of settable stops, means for setting said stops, transfer mechanism including a coöperating stop for each wheel, means controlled by a wheel of lower order for moving the coöperating stop of a wheel of higher order, a restoring device for said coöperating stop operated by the set stop of said wheel of higher order, and a setting lever to set the next succeeding stop, said setting lever being positively connected with said restoring lever for motion in both directions.

32. In a computing machine, the combination of a series of register wheels each carrying a series of settable stops, a coöperating stop for the settable stops of each wheel, a lever by which said coöperating stop is carried, means on a wheel of lower order for moving said stop lever toward the center of its wheel, a restoring lever free to move with relation to said stop lever in one direction but not in the other and said restoring lever adapted to be restored by the passage of the set stop and adapted to restore said stop lever, and a stop-setting lever operated by said restoring lever.

33. In a computing machine, the combination of a shaft having a flattened part and a cylindrical part and a peripheral groove in said cylindrical part, a sheet metal arm fixed into said peripheral groove and having a branch adapted to be bent to one side to allow of said arm being placed in position and to be bent back so as to engage the flattened part of said shaft to retain the arm in position and to prevent relative rotary motion between the shaft and arm.

34. In a computing machine, the combination of a shaft having a flattened part and a groove, and an arm notched so as to be slipped into the grooved part of said shaft, said arm having a branch adapted to be bent to one side to allow of the insertion of the arm into said groove and to be bent back to engage said flattened part to hold said arm in position.

35. In a combined typewriting and computing machine, the combination of numeral printing keys, a typewriter carriage, a movable device adjacent the typewriter carriage, a linkage connecting said movable device with the computing mechanism in the base of the machine, a spring at one end of the chain of mechanism comprising said device and said linkage, a means at the other end of said chain of mechanism which resists the pressure of said spring whereby said spring takes up all lost motion in said chain of mechanism, and means for operating said chain of mechanism at that end of said chain at which said resisting means is located.

36. In a combined typewriting and computing machine, the combination of numeral printing keys, a carriage for the typewriter, computing mechanism, denomination selecting mechanism including a universal bar operated by said keys, means limiting the return motion of said universal bar, an operating bar adjacent said typewriter carriage, connections between said universal bar and said operating bar, a spring applied to said operating bar and holding said universal bar against its limiting means, a series of denominational devices adjacent the typewriter carriage, means for arresting said denominational devices in normal position, denomination selectors in the computing machine, connections from said denominational devices to said denomination selectors, springs applied to said denomination selectors and holding said denominational devices against their stops through said connecting devices, and means whereby said operating bar operates any one of said denominational devices depending upon the position of the carriage.

37. In a writing and computing machine, the combination of a series of keys, a series of plungers operated by said keys and each having an arm, computing mechanism, means operated by said arms for controlling said computing mechanism, and disconnecting means including means for turning said plungers through a partial rotation to move said arms to positions where they will not operate said controlling means.

38. In a writing and computing machine, the combination of a series of keys, a series of plungers operated by said keys and each having an arm, computing mechanism, controlling means for said computing mechanism operated by said arms, a bar having guiding devices for said plungers, and means for moving said bar and guiding devices in such a way as to give a partial rotation to each of said plungers and thereby to move said arms to inoperative position.

39. In a writing and computing machine, the combination of a series of keys, a series of plungers operated by said keys and movable longitudinally thereby, said plungers being also capable of oscillatory motion, arms on said plungers, controlling devices for the computing mechanism operated by said arms, the construction being such that when a key is operated said arm snaps off of said controlling device and on the upstroke of the key said arm passes said device by a turning motion of said plunger, and means for turning all of said plungers to bring said arms to inoperative positions.

40. In a writing and computing machine, the combination of a series of keys, a series of plungers operated by said keys and movable longitudinally thereby, said plungers being also capable of oscillatory motion, arms on said plungers, controlling devices for the computing mechanism operated by said arms, the construction being such that when a key is operated said arm snaps off of said controlling device and on the upstroke of the key said arm passes said device by a turning motion of said plunger, means for guiding said plungers, and means for moving said guiding means to turn said plungers to inoperative positions.

41. In a computing machine, the combination of a series of register wheels each carrying a series of settable stops, means for setting said stops in accordance with numbers to be added, means for turning said wheels, coöperating stops for the set stops, a zero setting mechanism including a zero key, a reciprocatory frame having means for resetting the set stops that are in engagement with the coöperating stops, a second reciprocatory frame having means to arrest said register wheels in alinement, two levers, one for operating each of said frames, and a connection between said levers, one of said levers being connected with said zero key.

42. In a computing machine, the combination of a series of register wheels each carrying a series of settable stops, means for setting said stops in accordance with numbers to be added, means for turning said wheels, coöperating stops for the set stops, a zero setting mechanism including a zero key, a reciprocatory frame having means for resetting the set stops that are in engagement with the coöperating stops, a second reciprocatory frame having means to arrest said register wheels in alinement, two levers, one for operating each of said frames, a connection between said levers, one of said levers being connected with said zero key, and means operated by one of said levers for resetting any of said settable stops that may have been set since the last operation of the wheels.

43. In a computing machine, the combination with a series of register wheels each carrying a series of settable stops, and means for setting said stops in accordance with a number and resetting the previously operated stops, of correcting mechanism including an error key, a rock shaft having arms thereon, one of said arms connected with said key, a reciprocatory frame operated by one of said arms for resetting any of said stops that may have been set to operative position, a second bar operated by one of said arms, and means operated by said second bar for restoring to operated position any of said stops that may have been erroneously reset.

44. In a computing machine, the combination with registering elements, of a series of reciprocatory bars, horizontally disposed arms on which said bars are mounted, transverse pivots for said arms, and adjustable hangers for said pivots, said hangers, pivots and arms constituting the supporting and guiding means for said bars.

Signed at Brielle, in the county of Monmouth, and State of New Jersey, this 19th day of August A. D. 1912.

ALBERT H. ELLIS.

Witnesses:
V. S. COOK,
JOHN HULSART.

Copies of this patent may be obtained for five cents each, by addressing the "Commissioner of Patents, Washington, D. C."